US005670747A

United States Patent [19]

Lawer et al.

[11] Patent Number: 5,670,747

[45] **Date of Patent: *Sep. 23, 1997**

[54] APPARATUS FOR TERMINATING AND INTERCONNECTING RIGID ELECTRICAL CABLE AND METHOD

[75] Inventors: C. B. Lawer, Barrington; David E. Dunfee, North Hampton, both of N.H.; Harold P. Hilberg, Boxborough, Mass.; Philip S. Amato, Jr., South Berwick, Me.

[73] Assignee: D.G. O'Brien, Inc., Seabrook, N.H.

[ * ] Notice: The term of this patent shall not extend beyond the expiration date of Pat. No. 5,478,970.

[21] Appl. No.: 382,372

[22] Filed: Feb. 1, 1995

Related U.S. Application Data

[63] Continuation-in-part of Ser. No. 191,005, Feb. 3, 1994, Pat. No. 5,478,970.

[51] Int. Cl.[6] .................................................. H02G 15/06

[52] U.S. Cl. .................... 174/74 R; 174/75 R; 174/77 R

[58] Field of Search ................................ 174/74 R, 75 R, 174/75 D, 77 R

[56] References Cited

U.S. PATENT DOCUMENTS

| | | | |
|---|---|---|---|
| 2,177,508 | 10/1939 | Abbott | 174/75 R |
| 2,605,315 | 7/1952 | Hargett | 174/77 R |
| 2,655,638 | 10/1953 | Allen | 174/77 R |
| 2,735,993 | 2/1956 | Humphrey | 174/77 R |
| 2,963,536 | 12/1960 | Kokalas | 174/77 R |
| 3,197,730 | 7/1965 | Hargett | 439/606 |
| 3,816,641 | 6/1974 | Iversen | 174/76 |
| 4,689,440 | 8/1987 | Morin | 174/77 R |
| 4,725,783 | 2/1988 | Miyairi et al. | 174/75 R |
| 4,826,218 | 5/1989 | Zahuranec | 285/342 |
| 4,915,427 | 4/1990 | Zahurac | 285/342 |
| 4,995,646 | 2/1991 | Johnston et al. | 285/137.1 |
| 5,478,970 | 12/1995 | Lawler et al. | 174/74 R |

OTHER PUBLICATIONS

"Electrical Submergible Pump Workshop", Society of Petroleum engineers, Apr. 29–May 1, 1992, pp. 6–9.

"Bottom Feed Penetrator", Data Sheet, RMS Ltd, Pickering, North Yorkshire, Jul. 5, 1986,3 pp.

"Reda Pump Cable For Submergible Pump Systems", Catalog, 1989, REDA–A CAMCO Company, Bartlesville, OK.

"Swagelok Tube Fittings...a tradition of Excellence", Catalog, Mar., 1992, C–486–f, Swagelok Co., Niagara Falls, Ontario.

*Primary Examiner*—Kristine L. Kincaid

*Assistant Examiner*—Marc Machtinger

*Attorney, Agent, or Firm*—Lahive & Cockfield, LLP

[57] ABSTRACT

Electrical termination and connector structures for electrical cable, and a penetrator for electrical power and/or signals through a pressure barrier, provide, in different embodiments, mechanical attachment to the cable and to individual conductors of a multi-conductor cable; and provide fluid-tight seals to protect the terminated and interconnected conductors from adverse ambient gases and liquids. A molded elastomeric body, in one embodiment, provides the rugged fluid-tight seals. The electrical termination and connector structures withstand cycled pressure and temperature environments, and include a mechanism for restraining the extrusion or other displacement of cable insulation under conditions of cycled pressure and of temperature. The structures also accommodate axially adjustable installation and differential axial expansion and contraction.

53 Claims, 11 Drawing Sheets

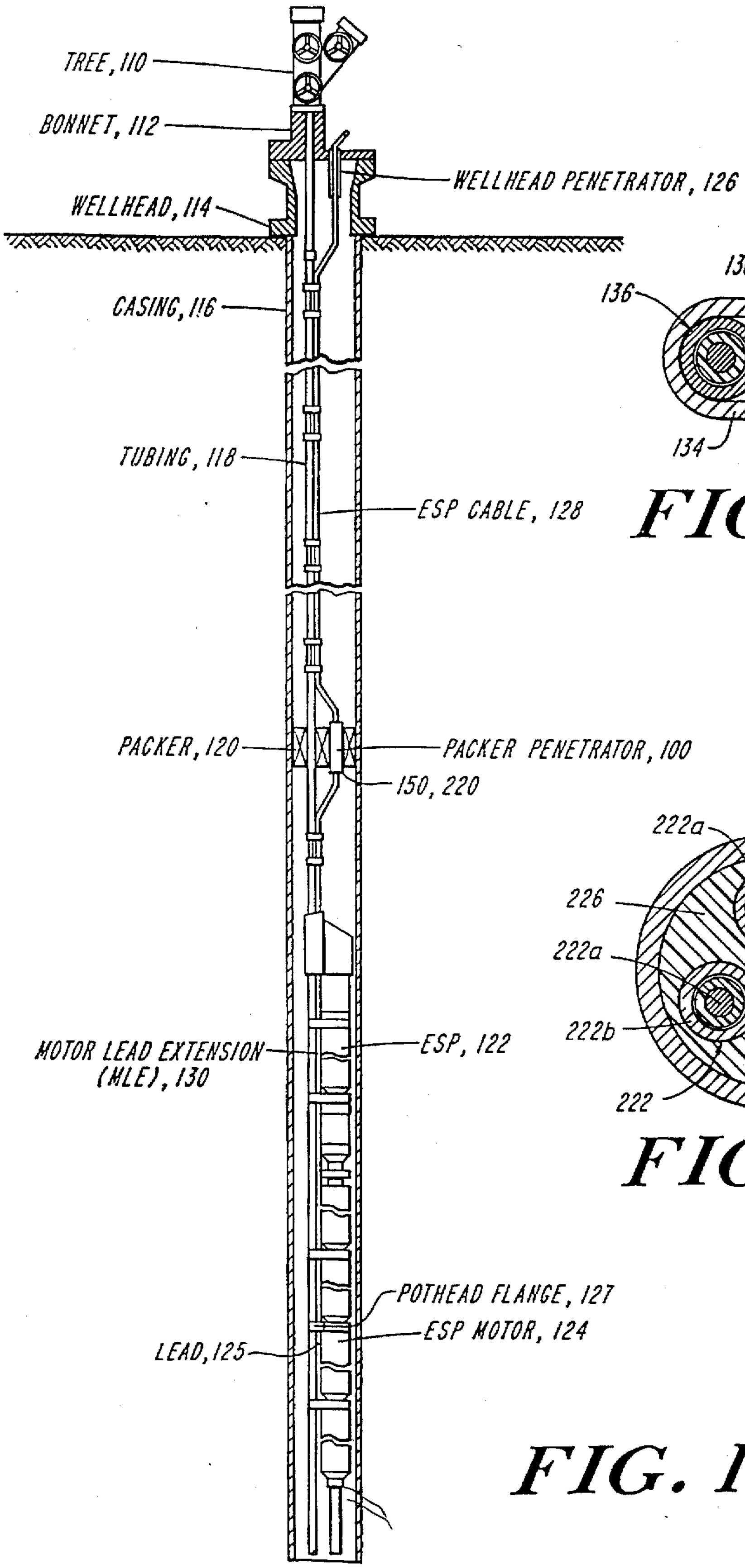
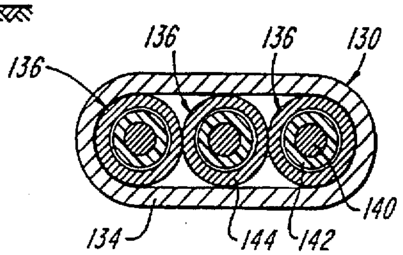
FIG. 1A
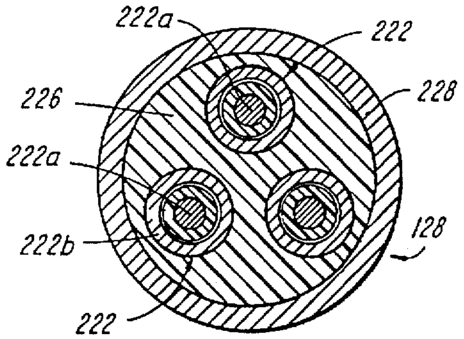
FIG. 1B
FIG. 1

APPARATUS FOR TERMINATING AND INTERCONNECTING RIGID ELECTRICAL CABLE AND METHOD

REFERENCE TO RELATED PATENTS

This application is a continuation-in-part of U.S. patent application Ser. No. 08/191,005, now U.S. Pat. No. 5,478, 970 entitled "Apparatus for Terminating and Interconnecting Rigid Electrical Cable and Method, filed Feb. 3, 1994, and assigned to the assignee of the present application.

BACKGROUND OF THE INVENTION

This invention relates to electrical terminations and connectors used in power and information transmission systems. More specifically, the invention provides electrical terminations and connectors for substantially rigid cable and which hermetically seal the conductors therein from adverse environments.

In applications where electrical equipment operates in adverse environments, it is important to protect the cable and the connectors which supply electrical energy and which communicate control signals with the equipment. It is not uncommon for the cable to be a multi-leg rigid cable having an armor jacket with each individual conductor therein insulated and protected by a further sheath. The jacket and the sheath can include a steel or other metal structure. The cable legs connect to the equipment or to other cables through connectors or by field splicing.

Typical adverse environments occur, for example, in the reactor vessel of a nuclear reactor, in a deep underwater environment, and in an oil well. In these and like situations, it may be necessary that an electrical connector or an electrical penetrator through a pressure barrier transmits electrical power and/or control signals across the barrier and maintains an environmental separation between the different conditions on opposite sides of the barrier. The electrical cables, connectors and penetrators typically are subjected to temperatures and pressures that can vary over wide ranges. They can also be subjected to corrosive liquids and gases.

In addition, it can be extremely costly and time consuming to repair these components in the event of a failure. For example, the repair of an electrical failure in a deep oil well typically requires the costly removal of equipment from the well and the subsequent replacement; all with the further cost of having the well shut down and hence non-productive. Such a system shut down and the repair procedure can endanger both personnel and the environment.

As the oil reservoir in a production oil field becomes depleted, the reservoir loses positive pressure and the oil flow diminishes, yet there may still be substantial amounts of oil in the reservoir. In addition, some oil fields and wells on the periphery of oil fields do not initially have positive pressure. Consequently, in these situations, pumping techniques are employed to recover oil from the well.

This pumping is accomplished by placing an electric submersible pump (ESP) into the pipe-like casing of the oil well and by providing various pressure barriers or bulkheads, also termed "packers", to seal the pressure between sections of the casing. Typically, power is delivered to the pump, which may be as deep as 15,000 feet below sea level, by a multi-conductor ESP power cable. In one mode of installation, the pump is located below a packer, and a motor lead extension (MLE) cable extends upward in the well casing from the motor of the pump to that packer, where it connects to the power cable. The packer has an electric penetrator structure for feeding electrical connections between the two different pressure environments that the packer separates. In another mode of installation, the submersible pump is housed in a production shroud located just above a packer. The electric penetrator structure penetrates the shroud and is connected to the ESP power cable and to the MLE power cable in a similar manner. Typically, each conductor of the ESP power cable is connected to a corresponding conductor of the motor lead extension cable by means of a packer penetrator. The packer penetrator typically has an American Petroleum Institute (API) standard fitting or API adapter to attach to the packer either on the uphole or the downhole side.

A typical prior MLE cable installation has an armored three-conductor cable and illustratively is one hundred or more feet long. Each cable leg includes a number 2, 4 or 6 AWG (American Wire Gage) solid copper conductor core which is insulated. The several insulated conductor cores are covered with a further insulating layer and with an outer protective sheath or jacket that is of lead or nitrile rubber. To form the connection between the ESP power cable and the motor lead extension cable, the armor and the lead protective layer and the insulating layers are removed to expose the conductors. Each conductor of the power cable is connected to a corresponding conductor of the MLE cable, either directly or by way of a conductor in an intermediate-pressure boundary header. The exposed conductors are overmolded with a rubber insulating layer and covered with a steel shell having an API adapter.

The environment in an oil well below the bottommost or deep-set packer is extremely aggressive. The pump, the motor lead extension and the packer penetrator structure can be exposed to corrosive materials mixed with sand and gravel at high temperatures and pressures. Unfortunately, the reliability of the foregoing and other conventional MLE power interconnect structures tends to be poor. A normal expected life of the prior structures often does not exceed 150 to 200 days. Due to the excessive costs associated with removing the submersible pump, as well as the cost of down time, it is desirable for the system to have a longer service life.

A common failure in a deep oil well is electrical shorting between the conductors or electrical shorting between a conductor and ground. Some of these failures occur as a result of the degradation of electrical insulation, often due to the migration of gas and fluids into the packer penetrator, in combination with the high temperatures and pressures to which it is exposed. Other failures occur as result of mechanical stresses produced by cycles of differential expansion, e.g. thermal expansion and contraction. These stresses are sufficient, for example, to extrude insulation through a seemingly minute opening, especially under high temperature conditions. Upon cooling, the insulation contracts and the extruded material leaves a void in an insulating layer. This void can quickly become filled with corrosive environmental elements that further degrade the insulating layer. Repeated cycles of heating and cooling can thereby progressively deteriorate the insulating structure until an electrical short circuit occurs, typically between a cable conductor and the grounded sheath. That condition can cause a complete system failure.

Other failures occur when hard-wired and/or relatively stiff cables are flexed or otherwise subjected, as during installation, to localized mechanical stresses. These stresses can lead to physical degradation of the cable and of the penetrator. Furthermore, a protective jacket of lead can be penetrated by gas or other fluids, which in turn degrade the insulating layer underneath.

It is an accordingly object of this invention to provide electrical cable, termination, connector and penetrator structures that operate reliably for extended time periods in adverse and cyclic pressure and/or temperature environments.

Another object is to provide electrical terminations for rigid cable and which are capable of extended operation under adverse and cyclic environments.

It is also an object of the invention to provide electrical terminations for rigid cable and which are hermetically sealed to resist degradation by an aggressive adverse environment.

A further object of the invention is to provide the foregoing electrical structures suited for deployment in inaccessible locations, such as within a deep well casing.

Other objects of the invention will in part be obvious and will in part appear hereinafter.

SUMMARY OF THE INVENTION

The invention attains these and other objects by providing, in one embodiment, a substantially rigid electrical cable with a hermetic armor sheath or jacket of a material such as stainless steel or nickel alloy, instead of lead or nitrile rubber. The termination at the end of the cable, and the interface between the termination and the cable, are hermetically sealed to preserve the conductor of each cable leg and the insulating layer(s). To this end, the cable sheath is hermetically sealed to the termination. Also, the termination can be provided with structure for preventing damage to the insulation by thermal and like stress. The cable termination can have structure for securing it to a wall or bulkhead that separates and isolates the environments on either side. The termination can mate electrically with another termination or connector.

In the context of this disclosure, the terms "hermetic seal" and "hermetically sealed" encompass a seal that resists migration of gases as well as liquids. The seal is of sufficient quality to restrict the migration of degrading elements, e.g. gases and fluids, as well as to restrict the effects of cyclings of temperature and of pressure to such low levels that enable the termination to function for an extended operating life.

A termination according to the invention can provide four functional components that operate reliably in adverse environments: a mechanical connection, a hermetic seal, an insulation termination and an electrical termination. The mechanical connection mechanically fastens the outer sheath or jacket of the terminated cable leg to the termination. The hermetic seal forms a barrier between the environments inside and the outside of the termination. The insulation termination maintains the integrity of the insulating layer of each cable leg at the terminated end. The electrical termination electrically connects the conductor in each cable leg with a conductor of another cable or device.

The mechanical connection bears the mechanical stresses between the termination and the cable. The termination can have a separate fitting for securing to each leg of a multi-leg cable. Alternatively, the termination can have a fitting for securing to the outer sheath of such a cable. Each termination avoids unwanted stress concentrations, which can degrade the insulation around and within each cable leg and which can degrade the support structure of the hermetic seal. One preferred practice includes compressing a metal ferrule into a tapered space between the termination and the sheath.

The hermetic seal prevents an aggressive environment from attacking the insulation and the conductor(s) of the terminated cable. It permits each electrical conductor of the cable to penetrate a bulkhead, while maintaining a sealed barrier between the environments on either side of the bulkhead. In one embodiment, a ferrule of lead or other malleable material is compressed into a tapered space between the sheath of the cable leg and the termination. The malleable character of ferrule enables it to be compressed radially inward by the termination onto the sheath, to form a secure and durable seal. The seal can be enhanced by providing a fine polished finish on the outer surface of the sheath and/or on the inner surface of the termination. Optional further sealing or backup seals can be provided, typically carried on the termination for engagement with the sheath. Seal reliability is improved by incorporating compression springs to provide resilient sealing forces acting on the malleable ferrule, to maintain a secure seal throughout expansion and contraction.

A termination according to the invention also provides a structure that supports and protects the exposed insulating layer of each cable leg to avoid damage in environments of extreme cycling of pressure or of temperature. The insulating layer and the conductor and the sheath expand and contract at different rates when subjected to changes in pressure or in temperature, thus creating longitudinal and radial stresses on the insulating material. These stresses can be of sufficient magnitude to extrude the insulation through any gaps in the protective sheath or in the termination. It is therefore also a feature of the invention to provide the cable termination with an insulation termination assembly that, in essence, retards the insulation from being extruded from within the sheath.

The insulator termination according to the invention maintains the physical and electrical integrity of the insulating layer. The insulator termination of the invention captivates the insulation at the terminal end of each cable leg. According to one practice of this feature, a portion of the outer sheath extending a first distance from the terminal end of a cable leg is removed. At least a portion of the thickness of the insulating layer extending part way along the first distance, and a portion extending under the sheath for a second distance, are removed. The insulation termination replaces portions of the sheath and of the insulating layer thus removed with a non-conductive structure that seats against and contains the cable insulation both within the cable sheath and beyond it. This structure of the insulation termination physically confines the cable insulation from being extruded and it ensures electrical insulation of the conductor from the sheath adjacent the end of the sheath. In one embodiment, the insulation termination assembly is resiliently biased to remain seated against the insulation under conditions of contraction. In an alternative embodiment, the insulation termination assembly is securely fastened to the sheath. The secure fastening and the resilient seating can both be provided.

The electrical termination of the invention provides an electrical connection between conductors in the terminated cable and those in a mating termination or connector. Typically, the conductor of each cable leg is provided with a matable contact for removably and replaceably engaging a mating conductor contact. In one embodiment, each cable conductor is provided with a socket contact having a base portion clamped to the cable conductor. The socket contact can be structured to accommodate relative axial movement between the interconnected cable conductors, such as is caused by thermal cycling Thus, in one embodiment of the foregoing practices, the sheath of each cable leg is hermetically sealed to the housing or shell of a termination or connector. The conductor of the cable leg is terminated with a contact that attains reliable electrical connection with a mating contact. The termination, which mounts the housing shell and the matable electrical contact, further engages the sheath of the cable leg with a secure hermetic seal and with a secure mechanical connection. With this arrangement, the entire termination protects and joins the electrical and mechanical systems of a stiffly-sheathed, i.e. substantially rigid, cable leg.

It is also a feature of a termination of the invention that the cable is terminated such that the sheath is hermetically sealed to a cable header portion of the termination and the header is joined to the termination shell in a hermetically sealed manner to prevent the migration of gas and other environmental fluids.

Features of a cable termination in accord with the invention also include the combination of a body element, a contact element and an attachment element, with one or more further elements. The body element, typically of rigid and electrically conductive material such as metal, as is the attachment element, is axially elongated and has an axial through passage. It has a tubular outer surface extending along the axis and configured to be mounted with axially adjustable location. The contact element, which typically includes an insulating portion forming a header or bulkhead through which one or more electrical contacts extend axially, mountingly seats in the passage of the body element with a fluid seal therebetween for sealing the axial through passage at least one axial location. The electrical contacts of the contact element are thus disposed within the passage, and each is arranged for connection to a cable conductor element and further arranged for removable and replaceable connection with a mating connection member. The attachment element attaches to the body element and is arranged for selective mounting engagement with the cable sheath element, typically by a mechanical clamping action.

A further element of this combination, in accord with the invention, is a structure for sealing each cable conductor element disposed within the passage of the body element from exposure to environmental fluid, i.e. gases and liquids, that might otherwise enter the through passage other than at the one axial location sealed by the mounting of the contact element within the passage.

This sealing structure in a preferred practice includes an insulating body disposed within the through passage of the body element and embedding the unsheathed length of each cable conductor element within that passage. More particularly, the sealing structure preferably includes a resiliently flexible insulating body disposed within the through passage and embedding each cable conductor element. Such insulating structure preferably is a molded body of flexible insulating material that is molded onto the assemblage of the cable terminated end with the contact element. That molded insulating body is telescopically assembled within the through passage of the body element to provide mechanical support for the conductor and contact structures it embeds and to provide fluid tight seals with the through passage.

Another element in accord of the invention for combination with the foregoing assemblage of the body element and the contact element and the attachment element is a mounting adapter element that has an axially extending through passage in which the body element telescopically seats with a selected relative axial placement.

Another feature in accord with the invention is that the tubular outer surface of the body element has, in one practice, a cylindrical surface portion for substantially continuous axial adjustable placement within the mounting adapter element. In a further embodiment, the tubular outer surface of the body element includes a plurality of axially spaced circumferential groove structures radially recessing the tubular surface. A locking element, such as a locking collar, seats in one such groove and is engaged with the mounting adapter element for positively fixing the axial position of the body element relative to the mounting adapter element. Such grooves are one embodiment of radially-engageable structure disposed at selected axial spacings along the tubular outer surface of the body element. Similarly, the locking collar is one embodiment of a locking element that engages with the radially engageable structure at any selected axial location along the tubular outer surface of the body element and that removably and replaceably engages with the mounting adapter element, for positively securing the body element at a selected axial location relative to the mounting adapter element.

A preferred practice of the invention, deemed optional, further includes selecting the material for the insulating structure, e.g. the molded insulating body, relative to the material of the termination body element such that the insulating body is compressively engaged within the through passage of the body element during actual use. By way of illustrative example, when such a termination is installed in a deep oil well where temperatures are significantly higher than at the sea bed or the earth surface, this optional preferred practice employs a molded body that undergoes greater thermal expansion than does the body element, so that the molded insulating body is radially compressed against the walls of the passage in the body element.

Another feature deemed optional is to provide adhesive for ensuring a secure bond and fluid seal between the molded insulating body and the through passage in the body element and other structural elements the molded body abuts or embeds.

The invention accordingly comprises the features of construction, combinations, and arrangements of parts exemplified in the constructions hereinafter set forth, and includes the several steps in relation to one or more other such steps for attaining such constructions and combinations of elements, as exemplified in the apparatus and the methods hereinafter disclosed, and the scope of the invention is indicated in the claims.

BRIEF DESCRIPTION OF THE DRAWINGS

For a fuller understanding of the nature and objects of the invention, reference is made to the following detailed description and the accompanying drawings, in which:

FIG. 1 is a diagrammatic view of an oil well installation of a submersible pump and embodying one practice of the invention;

FIGS. 1A and 1B are, respectively, enlarged cross-sectional details of the motor lead extension cable and of the submersible pump cable of FIG. 1;

DESCRIPTION OF ILLUSTRATED EMBODIMENT

Figure 2:
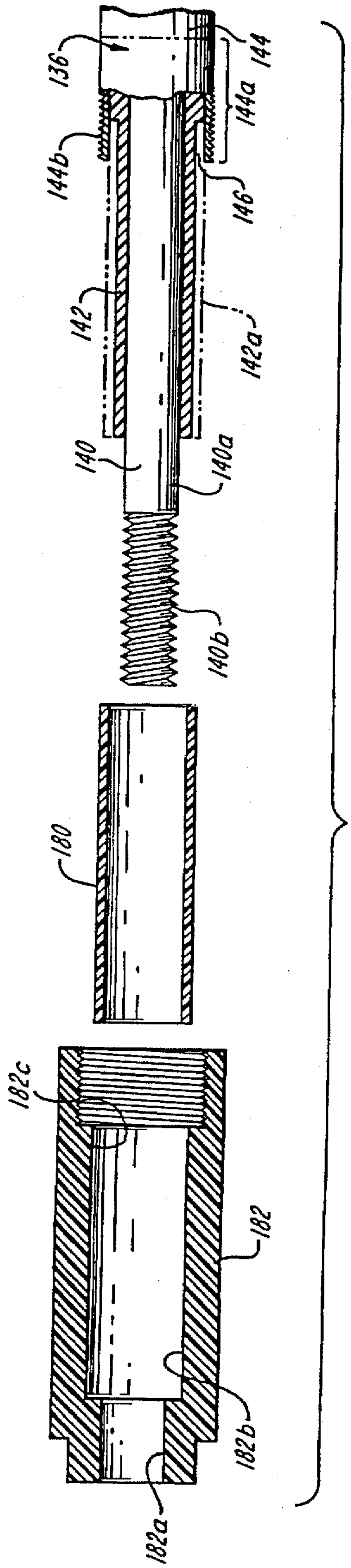
FIG. 2 is an exploded view of the end of an MLE cable leg prepared in accordance with the invention and further showing an insulation termination embodying feature of the invention.

FIG. 1 shows an illustrative oil well in which a packer penetrator 100 employs cable terminations according to the invention. At the top of the well, above the earth's surface, is a fitting 110, commonly designated a "tree", for piping crude oil from the well. The tree 110 is mounted on a bonnet 112 seated on a wellhead 114. A well casing 116 extends downward from the wellhead 114 to the bottom of the well. The wellhead 114 can be at the surface of the earth or at the floor of the ocean, i.e. at the sea bed. Production tubing 118 within the casing 116 feeds pumped crude oil upward in the well and through the bonnet 112 to the tree 110. The wellhead 114 and the bonnet 112 form a pressure barrier between the environmental conditions above the earth's surface or sea bed, depending on the installation and at the interior of the well casing 116 at the top of the well. A packer 120 seated in the well casing 116 near the bottom of the well, and fitted with the packer penetrator 100, provides a pressure and environmental barrier between the well casing above it and below it. The production tubing 118 extends from the wellhead 114 through the packer 120 to an electric submersible pump 122. The illustrated installation includes, below and connected with the submersible pump 122, a conventional arrangement including a pump intake, a protector and submersible electric pump motor 124.

As also shown in FIG. 1, a wellhead penetrator 126 at the top of the well couples electric power and control signals through the wellhead 114. An electric submersible pump (ESP) cable 128 extends within the casing 116 between the wellhead penetrator 126 and the packer penetrator 100, for transmitting electrical power. A motor lead extension cable 130 connects to the ESP cable 128 at the packer penetrator 100 and extends further downward within the casing 116 through a pothead flange body 127 to a connection lead 125 to the ESP motor 124. The series arrangement of electrical connections within the wellhead penetrator 126, through the ESP cable 128, within the packer penetrator 100, and through the motor lead extension cable 130 thus supply electrical operating power from above the well to the ESP motor 124 for operating the pump 122.

The detail view in FIG. 1A shows that the illustrated motor lead extension cable 130 has a substantially rigid outer metal jacket 134, typically of stainless steel or galvanized armor steel, that encloses three cable legs 136. The illustrated motor lead extension cable 130 thus has a flat configuration with the individual legs 136 side by side; another has a circular cross section. Each illustrated cable leg 136 has a central electrical conductor 140 surrounded by an insulation layer 142 and a protective sheath 144. In a typical embodiment as illustrated, the central conductor 140 is a solid copper conductor, typically of number 2, 4 or 6 American wire gauge (AWG) size. The insulation 142 typically includes a layer of ethylene propylene diene methylene and can include a wrap of a high dielectric tape or polyimide film, one such material is marketed by the duPont Company under the trade designation Kapton. The outer sheath 144 of the cable leg 136 is preferably a seamless tube of a strong metal such as stainless steel or a nickel alloy. A motor lead extension cable 130 for practice of the invention and as illustrated in the detail of FIG. 1A is commercially available, including from Reda, A Camco Company, of Bartlesville, Okla., USA. The motor lead extension cable 130 preferably is manufactured and/or processed to diminish plastic deformation when subjected to thermal cycling.

The detail view of FIG. 1B shows that the illustrated submersible pump cable 128 has an outer armored jacket 228 that encloses three conductor legs 222. Cable insulation 226 fills the spaces between the individual legs 222 and the outer jacket 228, which is typically of steel. Each conductor leg 222 has a stranded conductive core **222*a* within an insulator 222*b* of one or more layers. One commercial source of such a cable is the Camco Company, Reda, identified above. The packer penetrator 100 of FIG. 1, according to the invention, feeds electrical signals through the well packer 120 by electrically interconnecting the submersible pump cable 128, which is above the packer, with the motor lead extension cable 130 below the packer, and it maintains the pressure differential across the packer 120. Further, the penetrator 100** withstands exposure to corrosive fluids, both liquid and gas, and withstands repeated cyclings of temperature and of pressure over the wide ranges typically encountered in an installation such as the illustrated deep oil well.

The packer penetrator 100 provides a termination 220 for the electrical submersible pump cable 128 and it provides a mating termination 150 for the motor lead extension cable 130. The two terminations mate at the packer penetrator 100 and can be repeatedly joined and separated.

With reference to FIG. 2, a leg 136 of the illustrated motor lead extension cable 130 is prepared for assembly with the termination 150 by removing a short length of the sheath 144.

The outer surface of the newly formed terminal end portion **144*a* of the sheath 144 is polished, typically with an electrochemical process, to attain a selected outer diameter and a highly smooth surface finish. The terminated end of the cable leg is sealed, as with a sealing material and/or tape to prevent contamination of the insulation 142 and of the conductor 140** during this polishing and finishing process; the sealing material is then removed.

A short section of the exposed insulation 142 is removed entirely to leave an uninsulated plug portion **140*a* of the cable leg conductor. An outer layer portion 142*a* of the cable insulation 142 is removed, as indicated with dashed lines in FIG. 2 for a length extending from the conductor plug portion 140*a* to within the terminated end of the cable sheath 144. This removal of a radially-outer portion 142*a* of the insulation 142 from under the sheath 144 forms a tubular recess 146 in the insulation 142 that extends axially within the terminated sheath 144**.

The diameter of the removed insulation portion **142*a* is in the order of one-half the original radial thickness of the insulation 142. The insulation portion 142*a* can be removed to form the recess 146 by a trepanning operation. By way of illustration, for a motor lead extension leg 136 having a number 2 AWG conductor 140, the polished and smooth diameter of the terminal end portion 144***a* is 11.804±0.05 mm, the length of the sheath portion 144*a* that is finished to this selected outer diameter and surface finish is 15 cm., the axial length of the tubular recess 146 is 0.80 cm., the extension of the insulation 142 beyond the terminal end of the sheath 144 is 2.70 cm., and the length of the conductor plug portion 140*a* is 5.4 cm.

A further preparatory step, according to one practice of the invention, to terminate the motor lead extension leg 136 is to form threads 144*b* into the outer surface of the cable sheath 144, at the forward end of the end portion 144*a*, and to form threads 140*b* onto the outer surface of the conductor plug portion 140*a*. Also, as shown in the lower right portion of FIG. 3, the separate legs 136 of the motor lead extension cable are exposed and the cable outer jacket 134 is secured, for example as illustrated with a buckle 152 and a clamp 154. The buckle and the clamp can be of the type marketed by the Band-It Division, Houdaille Industries, Inc. under the Band-It trade designation.

Figure 3:
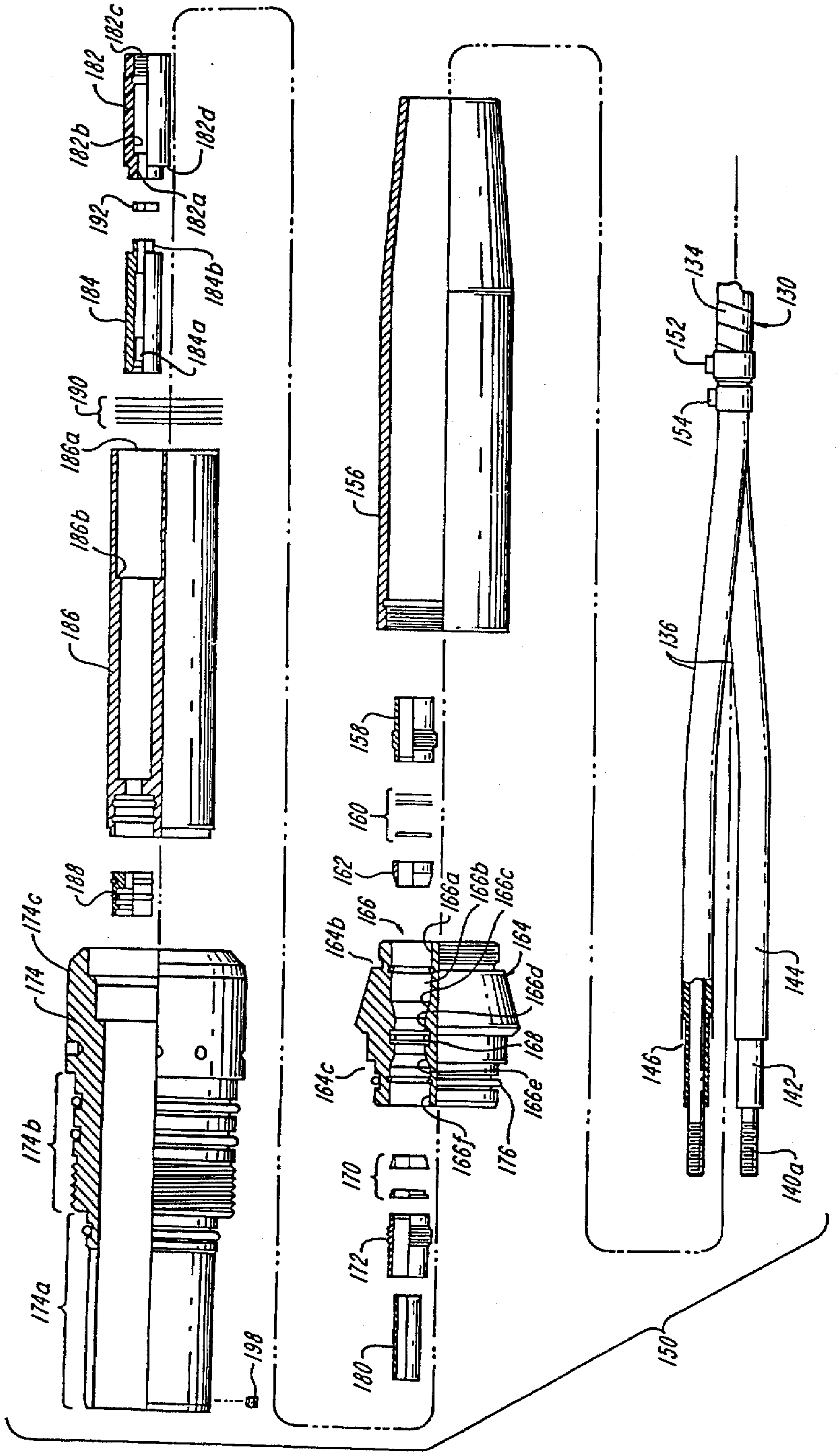
FIG. 3 is an exploded view of an MLE cable leg termination according to the invention.

With each leg of the motor lead extension cable 130 prepared as discussed above and illustrated in FIG. 2, the assembly of the illustrated termination 150 commences by threading all legs of the extension into a tubular, boot-like cable protector 156. As shown in FIG. 3 for one cable leg 136, which is illustrative for all legs of the multileg extension cable 130, the succession of a threaded nut 158, a set of thrust washers 160, and a soft metal packing or ferrule 162 is assembled onto each leg 136. The three legs of the illustrated three leg extension cable are then threaded through separate passages of a cable header 164.

The illustrated cable header 164 is a tubular body axially apertured with three parallel, through passages 166, one for receiving each leg of the illustrated motor lead extension cable 130. Each passage 166 has several axially successive portions, starting with a rightmost portion 166*a* that is threaded to receive the threaded nut 158, followed by a cylindrical portion 166*b* that receives the set of washers 160 and a cortically tapered, funneling portion 166*c* that receives the packing 162. A central portion 166*d* of each cable header passage closely fits with minimal clearance over the jacketed cable leg 136. This passage portion can optionally seat a sealing structure 168, illustrated as an O-ring axially between two back-up rings. The further succession of portions in each cable header passage 166 includes, as illustrated, a conically and tapered funnel portion 166*e* for receiving a set of ferrules 170, and a threaded portion 166*f* for receiving a threaded nut 172.

Figure 4:
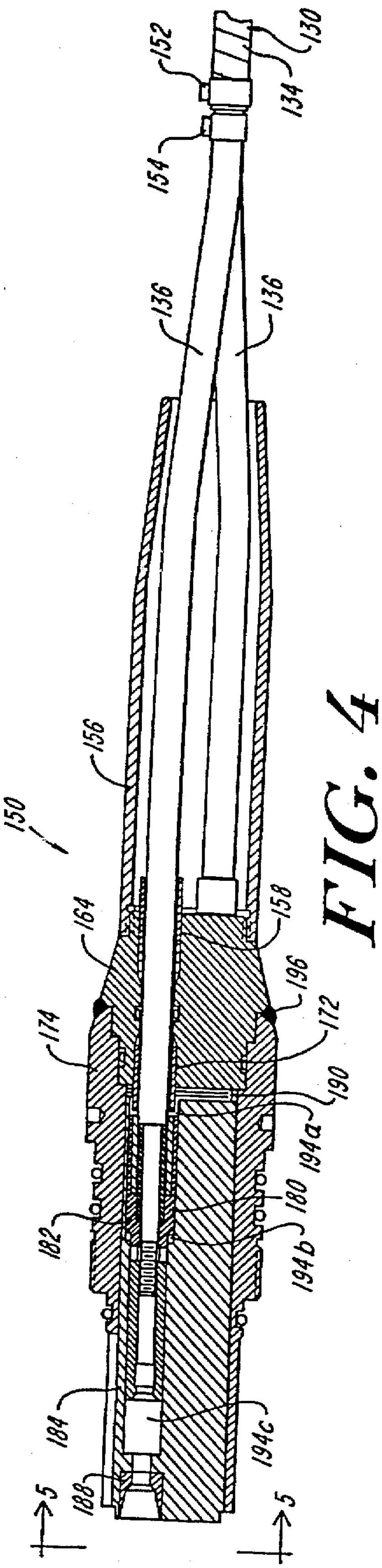
FIG. 4 is a sectional view of the MLE cable termination of FIG. 3 in assembled form.

The tubular outer surface of the illustrated cable header 164 has, as shown in FIGS. 3 and 4, a back neck 164*b* that telescopically fits within and seats an end of the cable protector 156. At the other, forward axial end, the cable header outer surface has a stepped cylindrical portion 164*c* that is grooved to seat an O-ring and is structured and dimensioned for interfitting telescopic assembly within a termination plug body 174.

With further reference to FIGS. 3 and 4, the cable header 164 is selectively positioned along the length of the extension leg 136, as measured from the terminated end of the leg, and the externally threaded nut 158 is threaded into the threaded portion 166*a* of the cable header passage 166, to compress the set of thrust washers 160 axially against the metal packing or ferrule 162 within the passage portions 166*b* and 166*c*, respectively. The threaded engagement of the nut 158 within the cable header passage portion 166*a* axially compresses the soft metal ferrule to deform it radially inward onto the substantially rigid sheath 144 of the cable leg 136. The ferrule preferably engages the selectively dimensioned and smoothly finished sheath end portion 144*a* (FIG. 2). This assemblage involving the cable header 164 and the ferrule 162 and the thrust washers 160 and the threaded nut 158, with the sheath of the cable leg 136, forms a pressure-tight and hermetic seal that excludes vapors and liquids external to the cable header 164 from entering the header passage 166 from the back, rightmost end in FIGS. 3 and 4, and hence, from entering the cable leg 136. The hermetic seal is between the cable header 164 and the outer surface of the sheath 144 on the cable leg 136.

The metal packing or ferrule 162 is a tubular element of malleable material such as lead, lead alloy, brass or copper, although other materials such as aluminum and soft iron and non-metals can be used, depending on the magnitude of the seal desired and consideration for galvanic action between dissimilar metals or other materials. The set of thrust washers 160 provides a bearing surface and preferably includes one or more flat washers contiguous with the ferrule 162 and one or more Belleville or like spring washers compressed by the threaded nut 158. The spring washers maintain a stiffly-yielding resilient compression on the ferrule 162 under low temperature and low pressure conditions, when the structured members are axially contracted.

With continued reference to FIGS. 3 and 4, in the further construction and assembly of the illustrated motor lead extension termination 150, the set of one or more ferrules 170 is assembled over the sheath 144 of each cable leg 136 followed by an externally threaded nut 172. The ferrules 170 are placed within a passage 166 of the cable header 164 and the nut 172 is threaded into the threaded portion 166*f* of that cable header passage. This assemblage of the nut 172 with the cable header 164, with the ferrules 170 compressed therebetween, forms a mechanical connection that again mechanically secures the cable leg 136 to the cable header 164. The set of ferrules 170 preferably forms a compound ferrule that includes a relatively hard metal ferrule that bears against a further ferrule; a thrust washer can be provided between the former ferrule and the nut 172. The hardnesses of the ferrules 170 are selected to compressively deform the cable sheath to form a secure mechanical engagement between the header and each cable leg. The nut 172 and such a thrust washer and the ferrules 170 are typically formed of stainless steel or nickel alloy materials. The set of ferrules 170, with at least two ferrule elements as illustrated in FIG. 3, in one preferred practice, is further structured and operates in the manner known for swaged tube fittings, such as those available from Swagelok Co.

The cable header 164 thus forms two axially successive compressive sealing engagements with the cable sheath 144, with the optional O-ring or like seal 168 axially therebetween. It is deemed preferable that the ferrules 162 and 170 of the two engagements have different hardnesses; in one practice the back-most ferrule 162 is the more malleable.

A third portion of the structure and assemblage of the motor lead extension termination 150 provides an insulation termination for the cable leg 136 and is formed with an insulating dielectric sleeve 180, and an insulator cap 182, as further illustrated in FIG. 2 and in FIGS. 3 and 4.

The insulating sleeve 180 telescopically seats on the terminated insulation 142 of the cable leg, and fills the tubular recess 146, FIG. 2. The insulating sleeve 180 is typically an electrical insulator that seals off any electrical strike path between the conductor 140 and the sheath 144. It confines the cable insulation 142 within the sheath 144 and, together with the insulator cap 182, resists flow and plastic deformation and extrusion of the insulation of the cable leg under conditions of extreme thermal and pressure cycling. The illustrated insulating cap 182 seats on and mechanically supports the cable conductor plug portion 140*a*, and the insulating sleeve 180 and the sheath 144. More particularly, the illustrated insulator cap has a tubular, e.g. hollow cylindrical, shape with a through central bore having three axially-successive passage portions: a front passage portion 182*a* that receives and seats on the exposed conductor 140, a mid portion 182*b* that telescopically seats closely over the insulator sleeve 180, and a back portion 182*c* of still larger diameter that telescopically seats with minimal clearance over the sheath 144. The combined structure of the sleeve 180 and the cap 182 compressively engages the cable leg insulation 142 both axially and radially, both in the recess 146 and hence within the sheath 144 and axially beyond the sheath.

The insulator cap 182 can be secured to the cable leg 136 by threading the passage portion 182*c* onto the threads 144*b* on the cable sheath 144. One alternative structure has no threads 144*b* and 182*c*, and instead axially compresses the cap onto the cable leg 136 by a subsequently assembled socket contact 184, FIG. 3, that securely attaches to the conductor plug portion 140*a*, as described further below. A set of disc springs, e.g. Belleville washers, is preferably interposed between the contact 184 and the cap 182 in this alternative embodiment, to maintain an axially compressive force on the cap 182 under conditions of varying material contractions and expansions.

The cylindrical tubular outer surface of the illustrated insulator cap 182 has a major cylindrical portion and, at the forward left end, an axially short section of lesser diameter. Both surface portions fit within one through axial passage of a multipassage insulator 186. In one preferred embodiment, the sleeve 180 and the insulator cap 182 are each of a plastic, electrically insulating material, such as polyetheretherketone (PEEK), preferably 30% glass filled; other electrically insulating materials can be used.

With continued reference to FIGS. 3 and 4, the electrical connection assembly of the illustrated cable termination 150 employs the multipassage insulator 186 that telescopically receives and seats a socket contact 184 for each cable leg 136 to which the termination connects. An elastomeric grommet 188 is seated in the front left end of each passage 186*a* of the insulator 186, and an axially stacked set 190 of Belleville springs or like spring washers is interposed between the multipassage insulator 186 and the cable header 164. More particularly, the illustrated socket contact 184 has a base 184*b* with an axial aperture that telescopically receives and seats the conductor plug portion 140*a* of a cable leg 136. The contact base aperture can be threaded to mate with the threads 140*b* on the conductor plug portion. In one preferred embodiment as illustrated, the contact 184 carries, on the base 184*b*, a circumferential clamp ring 192 that is compressed radially, after the contact is fully assembled onto the conductor plug portion, to ensure a reliable secure mechanical and electrical connection between the cable conductor and the socket contact. The clamp ring 192 is preferably a shape memory alloy that radially contracts upon being heated. As noted above, the assembly of the socket contact 184 onto the cable conductor 140 can also apply an axial compressive force onto the insulator cap 182 to secure it into place, and preferably an axially stacked set of spring washers (not shown) is provided axially between the socket contact and the insulator cap 182.

The illustrated socket contact 184 is thus essentially an electrically conductive cylindrical tube. The forward, major portion of the tube interior is dimensioned and structured for removable and replaceable electrical contact with a mating contact plug. The minor, back end of the contact aperture is part of the base 184*b* and is structured, e.g. threaded as illustrated, for mechanically receiving and assembling with the cable conductor plug portion 140*a*.

A preferred socket contact 184 establishes a telescopic removable and replaceable fit with a mating electrical plug contact to maintain electrical contact with the plug contact during conditions of differential thermal expansion and contraction, particularly of the cable conductor 140. A preferred illustrated socket contact 184 has a compliant conductive female contact insert 184*a* seated in the forward portion of the tube interior to ensure such a reliable electrical slip contact, i.e. to permit relative axial movement between the socket contact and the mating electrical plug contact. The socket contact insert 184*a* preferably is formed of an oxygen-free high-conductivity copper (OFHC), or a beryllium copper alloy or other high conductivity alloy.

As illustrated in FIG. 4, each passage 186*a* in the multipassage insulator 186 seats the grommet 188 at the front left end, has a cylindrical contact portion axially behind the grommet, and has a larger diameter back portion that telescopically seats over an insulator cap 182. The insulator 186 extends axially back, to the right in FIG. 4, beyond the cap 182 to compressively engage the set of spring washers 190 and thereby to compress the spring washers against the cable header 164, illustratively against the front leftmost axial face of the cable header 164. The cylindrical contact portion of each passage 186*a*, which receives a socket contact 184, is axially longer than the socket contact to accommodate axial displacement of the socket contact 184 when the cable conductor 140 to which the contact is attached undergoes axial displacement, including due to thermal expansion and contraction. Thus, the assembled termination 150 has, as shown in FIGS. 3 and 4, a relatively small axial clearance space 194*a* between the threaded nut 172 and both the insulator cap 182 and the back end of the multipassage insulator 186. A further axial clearance space 194*b* is provided between a forward shoulder 182*d* of the insulator cap 182 and an axially opposite shoulder 186*b* within the multipassage insulator. A further and significantly axially longer clearance space 194*c* is preferably provided within each passage 186*a* of the multipassage insulator 186 forward of the socket contact 184 seated therein.

The final structure and assembly of the illustrated cable leg termination 150 employs a plug body 174, FIGS. 3 and 4, that has an axial central passage that supportingly receives the multipassage insulator 186. The back, rightmost portion of the passage in the plug body has a progressively stepped diameter and telescopically fits over a mating structure 164*c* at the forward, left end of the cable header 164. O-ring seals, as illustrated with the O-ring 176 carried on the cable header 164, are preferably provided for attaining a fluid tight seal between the cable header 164 and the plug body 174. The plug body is secured to the cable header 164 by a connection 196, FIG. 4, suitably formed by brazing or welding the two parts together. As further illustrated in FIGS. 3 and 4, the multipassage insulator 186 is secured in the termination 150 by one or more radially extending pins or set screws 198 that extend through the wall of the plug body 174 and seat within the wall of the insulator 186.

The outer surface of the illustrated tubularly shaped plug body 174 has a front leftmost section 174*a* axially adjacent a radially larger midsection 174*b*. Each section, as illustrated, can be fitted to carry one or more sealing O-rings to enhance the seal with a mating plug body. The midsection **174*b* has external threads for threadably engaging such a plug body. A back section 174*c*** has a still larger outer diameter.

As also shown in FIG. 1, the MLE cable 130 extends from the packer penetrator 100 to the pothead flange 127. The pothead flange 127 also provides a mating termination for a lead 125 from the ESP motor 124. The two terminations mate at the pothead flange 127 and can be repeatedly joined and separated.

Figure 5:
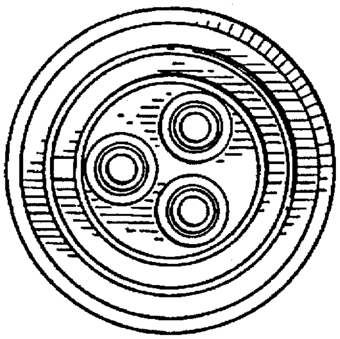
FIG. 5 is a transverse view of the assembly cable termination of FIG. 4 from the left side.
Figure 8:
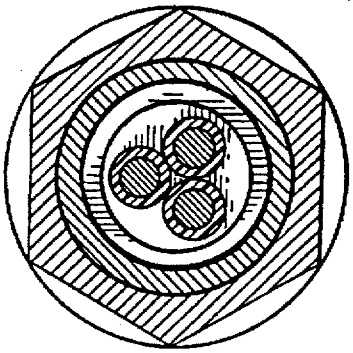
FIG. 8 is a transverse view of the assembled cable termination of FIG. 7 along section line 8—8.
Figure 9:
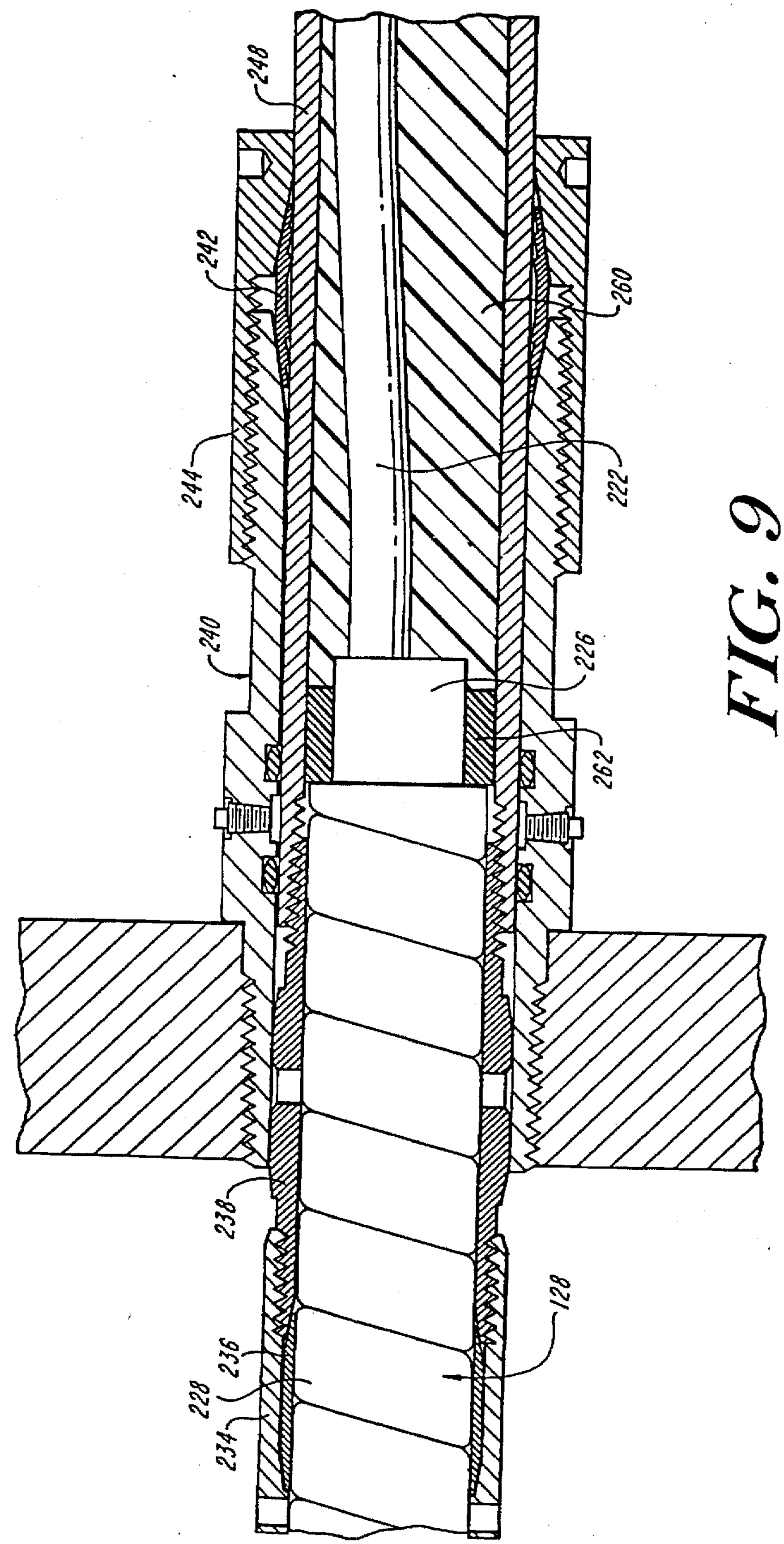
FIG. 9 is an enlarged fragmentary view of the cable termination of FIG. 7.
Figure 13:
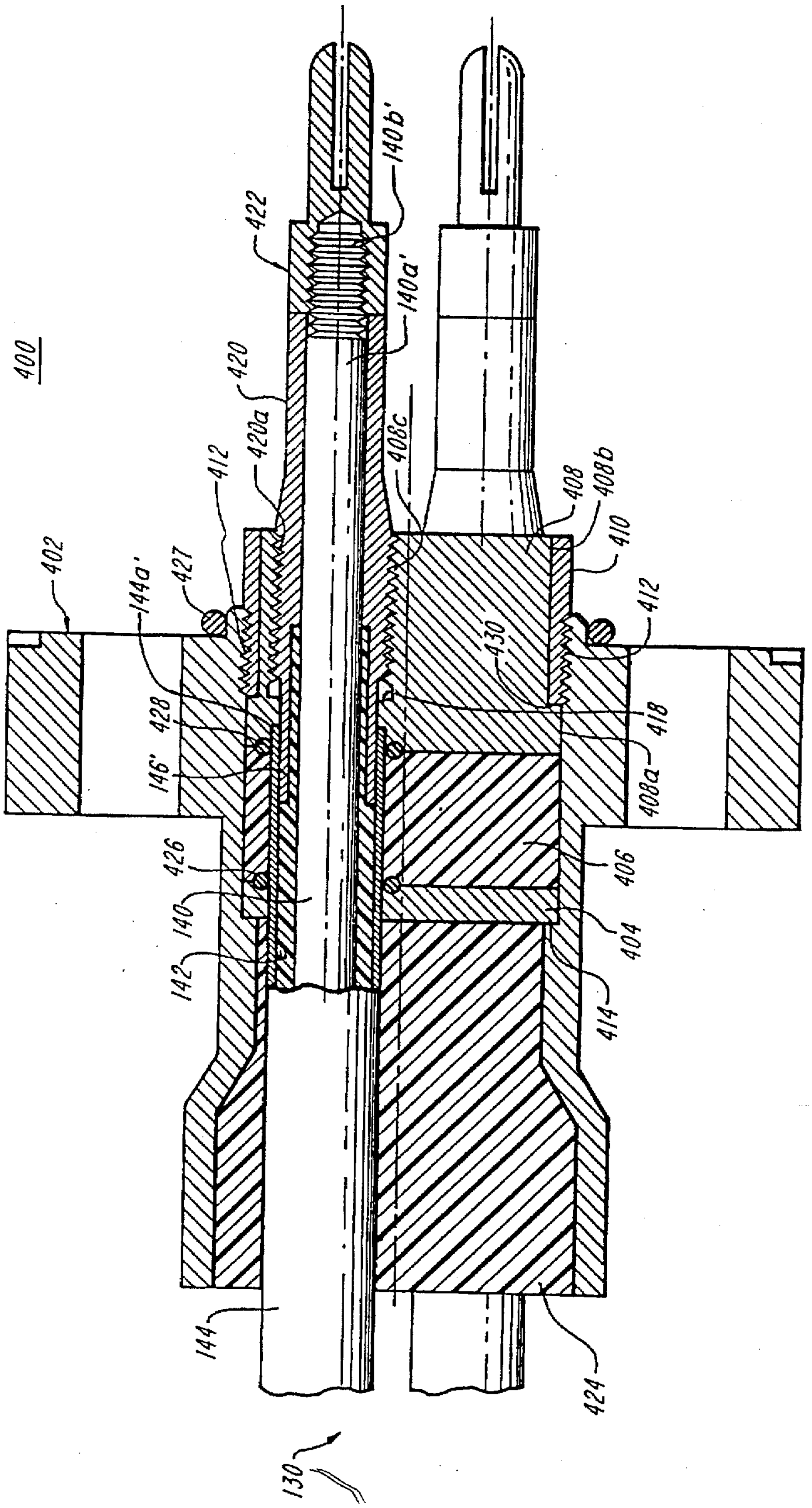
FIG. 13 is a sectional view of another termination for the MLE cable, further in accord with the invention.

FIG. 13 shows a sectional view of an assembled termination 400 of the MLE cable 130 at the pothead flange 127. The termination is generally cylindrical in structure and hence transverse views thereof correspond to the showings in FIGS. 5 and 8. Each leg 136 of the MLE cable 130 at termination 400 is prepared much in the same way as at termination 150, as discussed above with reference to FIGS. 2 and 3. Elements of the pothead termination assembly 400 that are similar to elements of the termination 150 are identified with the same reference numeral followed by a superscript prime. More particularly, a short length of the rigid sheath 144 is removed. The outer surface of the terminal end portion **144*a*' of the sheath 144 is polished to attain a selected outer diameter and a highly smooth surface finish. A short section of the exposed insulation 142 is also removed to leave an uninsulated plug portion 140*a*' of the cable leg conductor 140. A radially outer portion of the cable insulation 142 is removed for a length extending from the conductor plug portion 140*a*' to within the terminated end of the cable sheath 144. This removal, which can be accomplished by a trepanning operation, forms in the insulation 142*a*' a tubular recess 146', that extends axially within the terminated sheath 144. Unlike the termination 150, according to a preferred practice of the invention, threads are not formed on the outer surface of the cable sheath 144. However, threads 140*b*' are formed on the outer surface of the conductor plug portion 140*a*'**.

With each leg 136 of the MLE cable 130 prepared as discussed above and illustrated in FIGS. 2 and 13, the assembly of the termination 400 commences as follows. All three legs 136 of the MLE cable 130 are passed through the hollow interior of a flange body 402 of the pothead flange 127. As depicted in FIG. 13, the interior of the pothead flange body 402 is substantially cylindrical, having a stepped diameter to form a radially-extending support shoulder 414. A first support member 404 having three substantially parallel axial through passages fits over the far right terminal end of cable 130 and slides axially into position abutting the shoulder 414. Each axial through passage of support member 404 is adapted to seat and position the sheath 144 of one cable leg 136, and to support that cable leg 136 securely in radial position. Typically, the support member 404 is machined from a substantially rigid metal, and has an outer diameter sized to fit snugly in the hollow interior of the pothead flange body 402 when abutting shoulder 414. Likewise, the inner diameter of each of the axial through passages of the support member 404 is sized to engage the smoothly finished sheath end portion **144*a*' of each cable leg 136**.

Subsequent to installation of the first support member 404, a sealing member 406 also having three substantially parallel axial through passages is fitted over the far right terminal end of the cable 130 and slid into position axially to abut the first support member 404. The axial through passages of the sealing member 406 are aligned with the axial through passages of the first support member 404 and are located and dimensioned to engage the smoothly finished sheath end portion **144*a*' of each cable leg 136. As in the case of the first support member 404, the sealing member 406 is cylindrically shaped and has an outer diameter selected to interfit snugly in the hollow interior of the pothead flange 402**.

According to a preferred embodiment, the sealing member 406 is formed from a resilient high temperature elastomer. During operation, the sealing member 406 can be axially compressed causing it to deform both axially and radially to achieve fluid sealing engagements both with the first support element 404, with each cable leg 136, and with the cylindrical wall of the interior of the pothead flange 402. Another feature of the sealing member 406 is that it preferably is of a material that can be thermally energized. More specifically, as the ambient temperature surrounding the pothead flange 402 rises, this preferred sealing member 406 exerts by a relatively larger pressure to attain an increasingly higher pressure seal.

As shown, the illustrated assembly 400 includes an O-ring 426 encircling each portion **144*a*' of the sheath 144 and located axially at the junction between the axially aligned through passages of the first support member 404 and of the sealing member 406. As one skilled in the art will appreciate, each of these junctions can be chamfered or otherwise formed to accommodate an O-ring 426 and thereby to enhance the seal between the sealing member 406 and the polished sheath portion 144*a*'** of that cable leg.

With further reference to FIG. 13, according to the further assembly of the illustrated termination 400, a second support member 408, having three axially aligned substantially parallel through passages, is fitted over the far right terminal end of the cable 130 and slid into position axially abutting to the sealing member 406. The axial through passages of the second support member 408 align with the axial through passages of the first support member 404 and of the sealing member 406. Unlike the axial through passages of the first support member 404 and of the sealing member 406, the through passages of the second support member have a stepped inner diameter to form an annular inner collar 418 extending radially inward. When the second support member 408 is seated, as shown in FIG. 13, the collar 418 abuts the terminal end of the prepared portion **144*a*' of the protective sheath 144. This engagement determines the axial position of the cable 130 in the hollow interior of the pothead flange body 402**.

The second support member 408 has a substantially cylindrical outer wall with a stepped outer diameter that forms an annular radially-extending shoulder 430. More particularly, a first outer wall segment **408*a* of support member 408 has a first diameter and extends axially from the end abutting the sealing member 406; the first outer diameter is selected to interfit snugly in the hollow interior of the pothead flange 402, while allowing adjustment of the axial position of the member 408. A second outer-wall segment 408*b* of the support member 408 extends axially from the first segment and has a lesser outer diameter to form the shoulder 430 at the junction of the two segments. When the support member 408 is seated, as FIG. 13 shows, this shoulder is located axially within the hollow interior of the flange body 402**.

With further reference to FIG. 13, the flange body 402 has a tubular hollow interior that has threads 412 at the axial end that seats the support member 408. A correspondingly threaded gland nut 410 passes over the terminal right end of the cable 130 and engages the threads 412 of the flange 402.

The gland nut 410 telescopically fits in the flange body 402, and over the second outer-wall segment 408b of the support member 408. As the gland nut 410 is threaded into the flange body 402, it contacts and exerts an axial force on the shoulder 430 to press the support member 408 axially into the flange body 402, i.e., to the left in FIG. 13. When thus seated by the gland nut 410, the support member 408 exerts an axial force on the sealing member 406, i.e., axially compresses it, to cause the radial deformation that results in the above-discussed fluid sealing engagement. As in the case of the junction between the first support member 404 and the sealing member 406, the junction between the second support member 408 and the sealing member 406 can include O-rings 428 encircling each conductor sheath to improve the sealing engagement with each conductor sheath 144.

The illustrated termination assembly 400 further provides an insulating dielectric cap 420 on each uninsulated plug portion 140a'. Like the combination of the sleeve 180 and cap 182 of FIGS. 2 through 4, the function of the cap 420 is two fold. First, it seals off any electrical strike path between the conductor 140 and the sheath 144. Second, it confines the cable insulation 142 within the conductor sheath 144 to resist flow and plastic deformation and extrusion of the insulation 142 under conditions of extreme thermal and pressure cycling.

As shown in FIG. 13, each insulating cap 420 can be secured relative to one cable leg 136 by external threads 420a on the cap which engage corresponding internal threads 408c in each through passage of the second supporting member 408. When installed, the cap 420 telescopically seats on the terminated insulation 142 of the cable leg 136, and fills the tubular recess 146. In this way the cap 420 compressively engages the cable insulation 142 both axially and radially, both in the recess 146 and hence within the sheath 144 and axially beyond the sheath 144. The insulating cap 420 also seats on and mechanically supports the cable conductor plug portion 140a'.

The threaded portion 140b' of the plug 140a' protrudes from the terminal right end of the cap 420 to enable an electrical contact 422 to be attached by mating threads. As FIG. 13 also shows, the far left end of the illustrated flange body 402 has a radially-enlarged tunnel-like portion and is filled with a potting material, such as epoxy, that is cast in place to further secure the cable 130 within the flange body 402.

Thus, the sealing member 406, in combination with the support members 404 and 408, clamp and seal each conductor leg 144 to the flange body 402 to resist radial movement and to position the conductor leg 144. The cap 420 threads to the support member 408, which is itself secured to the flange body 402 by gland nut 410. In this way, the termination assembly 400 provides an alternative approach to terminating a multiple leg cable, while still providing a mechanism for achieving fluid sealing engagement and preventing extrusion of the cable insulation.

In one preferred embodiment of the termination 400, the support members 404 and 408 and the gland nut 410 are of strong and corrosion resistant metal alloy, preferably monel 400; the sealing member 406 is an elastomeric compound of the type sold under the trade designation AFLAS; and the insulator 420 is of polyetheretherketone.

With reference again to FIG. 1, the motor lead extension cable termination 150 described above with reference to FIGS. 2 through 5, attaches and electrically mates with a termination 220 that terminates the electric submersible pump cable 128. In the illustrated embodiment, the cable termination 220 is a plug termination, whereas the cable termination 150 is a socket termination. The terms plug termination and socket termination are used herein for clarity to distinguish the structures of the two terminations, however, it is to be understood that the structure of each termination can be practiced with either an electrical socket configuration or an electrical plug configuration.

The socket termination 220 of the invention, as shown in FIGS. 6 through 9, has an adapter portion that mounts to the packer 120 (FIG. 1) with a pressure and fluid tight seal. The adapter secures the cable termination with significant axial positioning adjustment to accommodate for varying cable lengths relative to the location of the packer 120. The socket termination also has a clamp portion that clamps to the submersible pump cable 128 and mechanically secures it to the termination. An electrical connection portion of the plug termination of the invention electrically terminates the ESP cable 128 with electrical contacts, illustrated as plug contacts, for repeated removable and replaceable mating connection with a mating, i.e. socket type, electrical connection such as provided by the cable termination 150 described above.

Further structural portions and features of the plug termination 220 of the invention enhance the electrical insulation of the separate electrical legs of the terminated cable and provide seals that exclude contaminants, particularly corrosive gases and fluids, from the interior of the penetrator where the electrical conductors are housed.

Figure 6:
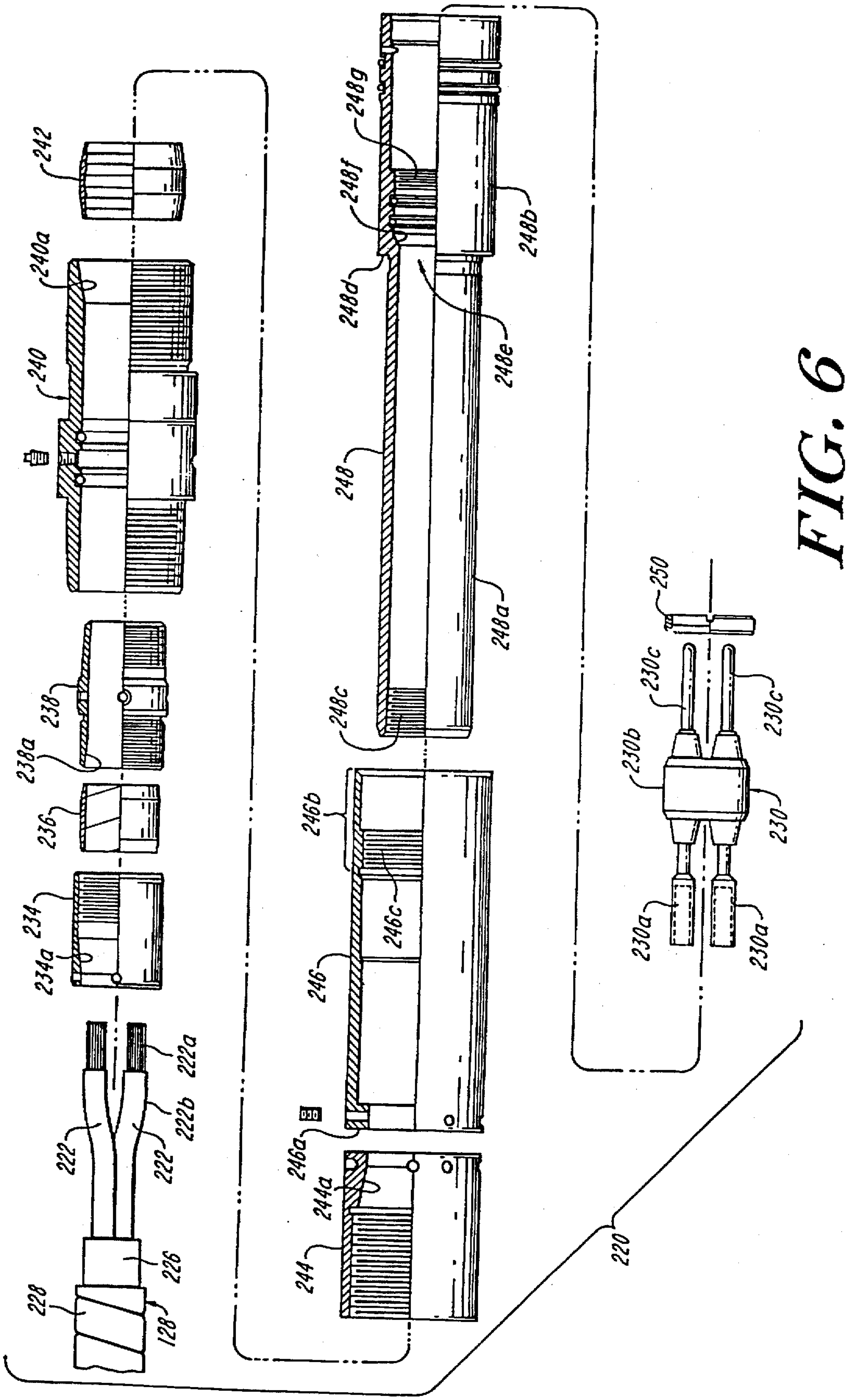
FIG. 6 is an exploded view of an ESP cable termination according to the invention.
Figure 7:
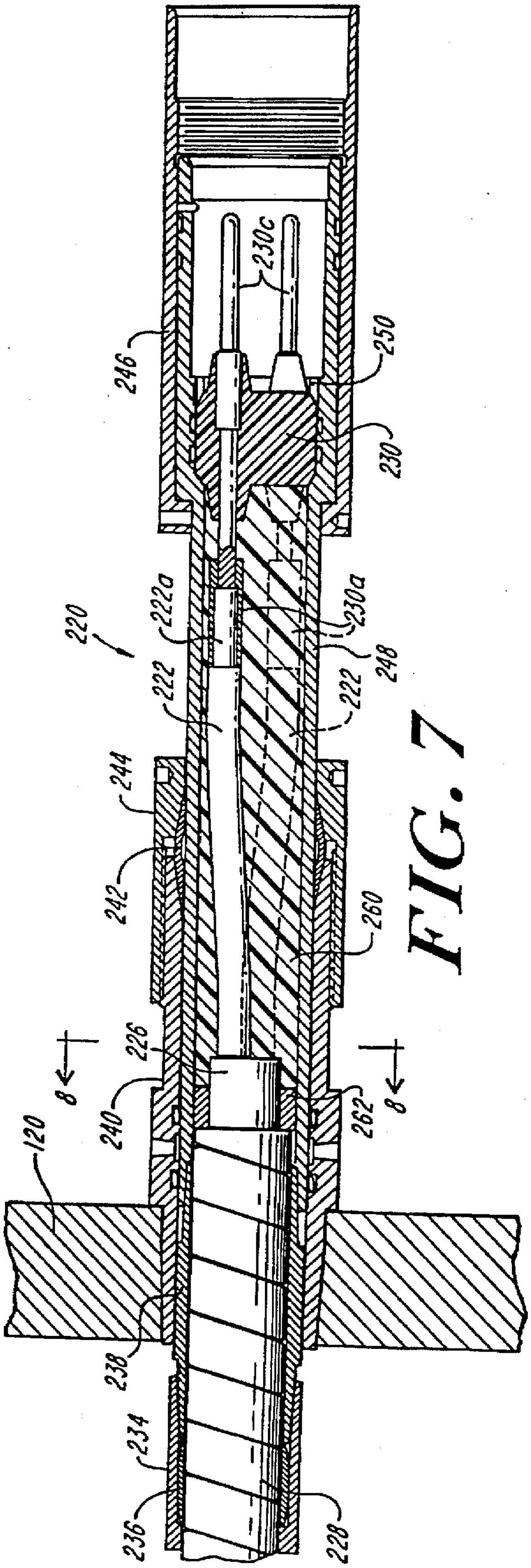
FIG. 7 is a sectional view of the ESP cable termination of FIG. 6 in assembled form.

More particularly, with reference to FIGS. 6 and 7, the plug termination 220 is illustrated as terminating an electrical submersible pump cable 128 that has three conductor legs 222, each with a stranded conductor core 222a enclosed within an insulator 222b. The several insulated conductor legs are enclosed and embedded within a further insulating jacket 226 that is within an outer armored jacket 228. This cable 128 structure is illustrative of a conventional three-conductor number 1 AWG ESP cable.

The terminated end of the cable 128 prepared as illustrated in FIG. 6 is inserted through the succession of termination parts shown in FIG. 6, and each exposed conductor core 222a is seated in one sleeve receptacle 230a of a multi-contact header 230. The multi-contact header 230 has a cylindrical body 230b of electrically insulating material through which three electrical contacts 230c axially extend. The illustrated contacts 230c are triangularly disposed, similar to the arrangement of the three conductor cores 222a as appears in FIG. 8. The back end of each contact 230c, axially extending to the right in FIG. 6, is an electrical contact plug dimensioned to telescopically interfit within a socket contact 184 of the above-described socket cable termination 150, FIG. 4. The other, front end, leftmost in FIG. 6, of each contact 230c forms the sleeve receptacle 230a that receives and that electrically and mechanically secures to one conductive core 222a of the cable 128.

The illustrated header body 230b is molded and each electrically conductive contact 230c extends axially through the header body. Each contact is hermetically sealed to the header body and is mechanically secured to it. The header can employ sealing structures and techniques known for glass-to-metal fixtures of this type or those known for ceramic to metal fixtures. A third alternative employs a thermoplastic header body 230a, preferably of EDPM, bonded and secured to the conductive metal contacts.

With further reference to FIGS. 6 and 7, further elements of the illustrated plug termination 220 include, starting from the aligned sequence in FIG. 6 closest to the terminal end of the cable 128, a hollow tubular clamp coupling ring 234 into which a deformable cable clamp 236 telescopically fits and further includes a cable clamp adapter 238. A penetrator coupling collar 246 seats over the back, tight end of a penetrator body 248 into which the multi-contact header 230 is secured by way of a header locking nut 250. These and other parts of the termination which are not electrically insulating are typically of metal, such as stainless steel and/or nickel alloys.

A mounting adapter 240 mounts the plug termination 220 to external structure, e.g., at a well packer 120 (FIG. 1). The adapter 240 typically is installed in the packer 120, as shown illustratively in FIGS. 7 and 9, and receives the termination 220 upon attachment of the termination to the cable 128. The mounting of the adapter to the packer forms a pressure and hermetic barrier therewith, and the adapter forms a like barrier with the termination. Thus, the assembled termination 220 and adapter 240 form a pressure and hermetic barrier between the environment with the well casing 116 above the packer 120, and the environment below the packer.

As further illustrated in FIG. 6, a locking collar 242 telescopically fits within the adapter 240 from the back side, right side in FIG. 6, and is clamped thereto by an adapter coupling ring 244.

More particularly, with continued reference to FIGS. 6 and 7, the illustrated penetrator body 248 is an elongated electrically conductive, e.g. metal, tube, with a relatively long adjustment portion **248*a* and a shorter coupling portion 248*b*. The adjustment portion 248*a* has a generally cylindrical outer surface and a cylindrical inner surface with an internal thread 248*c* at the front, left end. The coupling portion 248*b* has a generally cylindrical outer surface with a larger diameter than the adjustment portion 248*a* to form a radial step 248*d* between the two portions. The radial step 248*d* serves as an axial stop to retain the collar 246 and to limit axial movement of the collar relative to the penetrator body. The outer surface of the coupling portion 248*b* is illustrated as seating two axially spaced O-rings, each axially between a pair of backup rings, for sealing engagement with the inner cylindrical surface of the coupling collar 246** in the assembled termination.

The inner surface of the illustrated penetrator body 248 has a tubular section that has at one end a tapered shoulder **248*f* axially proximal to the external shoulder 248*d*. The body portion 230*b* of the multi-contact header 230 seats this tubular section, in abutment with that tapered shoulder, as FIG. 7 shows. A pair of axially spaced O-rings, each between backup rings, is carded on the inner surface of the illustrated penetrator body coupling portion 248*b* for sealingly seating against the body 230*b* of the header. The header locking nut 250 has an external thread that engages within a mating internal thread 248*g* within the penetrator body coupling portion 248*b*. Thus, the illustrated coupling portion 248*b* has a header mounting portion 248*e*, with a header-body sealing section axially between an inwardly tapered shoulder 248*f* and the internal threads 248*g* that receive the header lock nut 250. A further portion of the penetrator body coupling portion 248*b*, to the right of the header-mounting portion 248*e*, houses the projecting electrical plugs formed by the contacts 230*c*, and receives the end of a mating connector such as the socket cable termination 150 of FIG. 4**.

The penetrator coupling collar 246 has a hollow tubular structure with a forward end shoulder **246*a* projecting radially inward axially to abut against the shoulder 248*d* of the penetrator body. The remaining tubular portion of the collar 246 extends telescopically over the outer surface of the penetrator body coupling portion 248*b*, in sliding sealing engagement with the external O-ring seals on the penetrator body 248 to project a receptacle portion 246*b* axially beyond the penetrator body, for receiving therein a mating connector such as the socket termination 150. An internal thread 246*c* threadably engages a mating externally threaded surface on the plug body 174 of that cable termination 150**.

With continued reference to FIGS. 6 and 7, the structure and assembly of the illustrated plug termination 220 includes securing the cable clamp adapter 238 to the penetrator body 248. This is done by seating the externally threaded back end of the adapter 238, at the right in FIG. 6, within the internal threads **248*c* at the front end of the penetrator body 248**, and rotating the clamp adapter to threadably join to the penetrator body.

The axial lengths of parts of the plug termination 220, and particularly of the elements 234, 236, and 238 are such that, at this juncture, the intact outer protective jacket 228 of the terminated cable 128 is axially within both the clamp coupling ring 234 and the cable clamp 236, and at least within the forward approximately one-half portion of the cable clamp adapter 238, as shown in FIG. 7. The cable clamp coupling ring 234 has an internal thread at its back end that telescopically fits over and threadably engages an external thread on the front end of the cable clamp adapter 238. Threading the two parts 234 and 238 together, with the clamp 236 axially compressed between an inwardly tapered camming surface **238*a* of the clamp adapter 238 and a similar compressively inwardly tapered camming surface 234*a* within the coupling ring 234 deforms the clamp 236 radially inward into radial compression engagement with the outer jacket 228 of the cable 128**.

The illustrated cable clamp 236 is essentially a tubular female having either a split structure and/or of a selectively malleable metal or like material to deform radially inward in response to axial compression against the camming surfaces **234*a* and 238*a*. The tubular inner surface of the cable clamp preferably is configured substantially to conform to the convolutions or other surface structure of the cable armor jacket 238**

The coupling ring 234 is a tubular structural member, typically of metal, illustrated as having a cylindrical outer surface and a tubular inner surface that forms the camming surface **234*a* axially forward of the internal threads that engage the clamp adapter 238. The adapter 238 is likewise a structural tubular member illustrated as having three axially successive portions, namely the externally threaded forward portion, the tapered front inner face of which compressively bears against the cable clamp 236 and the axial span of which telescopically threads within the clamp coupling ring 234. An axially central portion of the clamp adapter can be apertured at different circumferential locations to receive a spanner wrench for use in assembly. The clamp adapter has an axial back portion that is externally threaded to telescopically thread within the penetrator body threads 248*c***.

FIG. 7 also shows that a preferred practice of the invention includes molding an electrically insulating body 260 onto the assemblage of the header 230 and the prepared end of the cable 128. The molded body 260 extends axially between the header body **230*b* and the outer armor jacket 228 of the cable. It thus surrounds and embeds the header contacts 230*a*, and the exposed lengths of the cable insulation 226 and of the cable conductors 222**.

The insulating body 260 is formed, in one practice, by molding it onto the assembled cable end and header, in a mold. The insulating body 260 is typically a moldable elastomeric material, such as ethylene propylene diene methylene (EDPM). The mold forms essentially a cylindrical cavity that is closed at one axial end by the header body **230*b*. The other axial end of the mold cavity can be closed by an electrically-insulating annular collar 262 seated on the cable insulation 226 and butted against the end of the cable outer jacket 228. The collar 262 then, in effect, becomes part of the termination 220. The generally cylindrical outer surface of the molded body 260** can include circumferential sealing ribs and/or grooves for seating or forming O-ring or like sealing members.

The insulating body 260 blocks the entry of contaminants, including dirt and grit as well as liquids and gases, into the otherwise void spaces it fills within the penetrator body 248. Further, the body holds the cable conductors 222 relatively stationary within the assembled termination 220.

A further practice of the invention, considered optional, includes providing a coating material that ensures a secure bonding sealing engagement between the molded body and the surfaces it abuts or otherwise engages. Thus, adhesive is provided at the interface between the insulating body 260 and one or more adjoining contiguous elements, to ensure a fluid tight seal, i.e. a seal resistant to both gases and liquids. According to this further practice, adhesive is applied to the interface between the molded body 260 and the multi-contact header 230, and between the tubular surface of the molded body 260 and the inner surface of the penetrator body 248 in which it is seated. Moreover, adhesive can be provided between the molded body 260 and the collar 262 or other structure it engages.

By way of non-limiting illustration and example, in one practice, prior to molding the body 260, adhesive is applied to the cable insulation 226 and cable insulation **222*b* that are in contact with the molded body. Adhesive is also applied to the surfaces of the collar 262 that is to abut the molded body 260 as well as to the surfaces of the header body 230*b* and of the header contacts 230*a***.

After the molded body is prepared and prior to assembly with the penetrator body 248, a further adhesive or other seal-ensuring material is applied to one or both of the outer surfaces of the molded body and the surface of the tubular passage of the penetrator body in which the molded body seats. A solvent based adhesive, such as one marketed by Lord Elastomer Products in Pennsylvania under the trade designation Chemlok 205/235 or 7701/235 is deemed preferred for bonding an insulating body 260 of EDPM to copper header contacts **230*a* and to the metal penetrator 248. A further solvent based adhesive designated as Chemlok 7701/238 is deemed preferable for bonding an EDPM insulating body 260 to insulation, such as of EDPM, of the cable 128. Solvent based adhesives marketed by Morton International, Inc. of Ohio under the designation Thixon 200/P63 are deemed preferable for bonding between a header body 260 of EDPM and nitrile and PEEK insulators that may, for example, be used for the header body 230*b*** or for part of a cable insulation jacket.

Thus, the assembly of the illustrated plug termination 220 onto a cable 128 includes, after the collar 262 (FIG. 7) and the parts of the termination are placed on the cable in the sequence shown in FIG. 6, the sequence of securing, as by crimping and/or soldering, each cable conductor core **222*a* into a socket 230*a* of the header 230, and then molding the insulating body 260. The header 230 is then secured to the penetrator body 248 by way of the locking nut 250. The coupling collar is telescopically positioned over the back end of the penetrator body 248 as in FIG. 7, and the clamp adapter 238 is next threaded into the penetrator body 248. The coupling ring 234 is then threaded onto the clamp adapted 238, with the cable clamp 236 axially compressed therebetween, to engage the clamp 236 radially inwardly onto the outer sheath 228** of the cable for a secure mechanical engagement that sustains axial and bonding (radial) loads between the cable and the termination.

The installation of the plug termination 220 to the mounting adapter 240 secures the termination with selected axial positioning. The cylindrically surfaced adjustment portion **248*a* of the penetrator body is telescopically seated at this juncture within the adapter 240 and can extend beyond the adapter to extend axially within the body of the packer 120. Thus, the adjustment portion of the penetrator body 248 is adjustably positionable within the internal passage of the adapter 240. This adjustable positioning accommodates different axial positions of the socket termination 150**, which is mated with the plug termination, during field installation.

The penetrator body is secured in the desired axial position relative to the adapter by threading the adapter coupling ring 244 onto the adapter 240 with the locking collar 242 axially compressed between the two elements 240 and 244. In particular, the axial back end of the adapter 240 is externally threaded to threadably fit within an internal thread at the front end of the adapter coupling ring 244. This assembly axially compresses the locking collar 242, which can be a split collar, between a conical radially inwardly camming surface **240*a* on the adapter 240 and a similarly tapered inner camming surface 244*a* of the coupling ring 244; the tapered surface 244*a* is axially offset from the internal thread of the coupling ring 244 as illustrated. The resultant axial compression of the locking collar 242 compresses it radially inward onto the tubular outer surface of the adjustment portion 248*a* of the penetrator body to mechanically secure the penetrator body 248 within the adapter 240**.

The resultant termination 220 and packer penetration which the invention provides for a substantially rigid cable such as the electrical submersible pump cable 128 is in part characterized by secure mechanical connection of the assembled termination to the cable jacket and, by way of the adapter 240, to the body of the packer 120. A further feature of the termination and penetration is the structure for adjustably accommodating significant axial positioning of the termination, by way of the penetrator body 248 adjustment within the adapter 240. The assembled termination 220, when mounted in the adapter 240, provides a succession of seals between the environment outside or external to the termination and the tubular space within the termination in which the cable conductors are secured. In addition, the assembled and mounted termination subjects the cable conductors and the cable insulation to minimal distorting forces or stresses, including due to cycling pressure and temperature conditions, and subjects it to minimal mechanical strain during handling and installation. Another feature of the assembled and mounted termination is the relative facility for assembly with a minimum of specialized equipment or processing or human skills.

Figure 10:
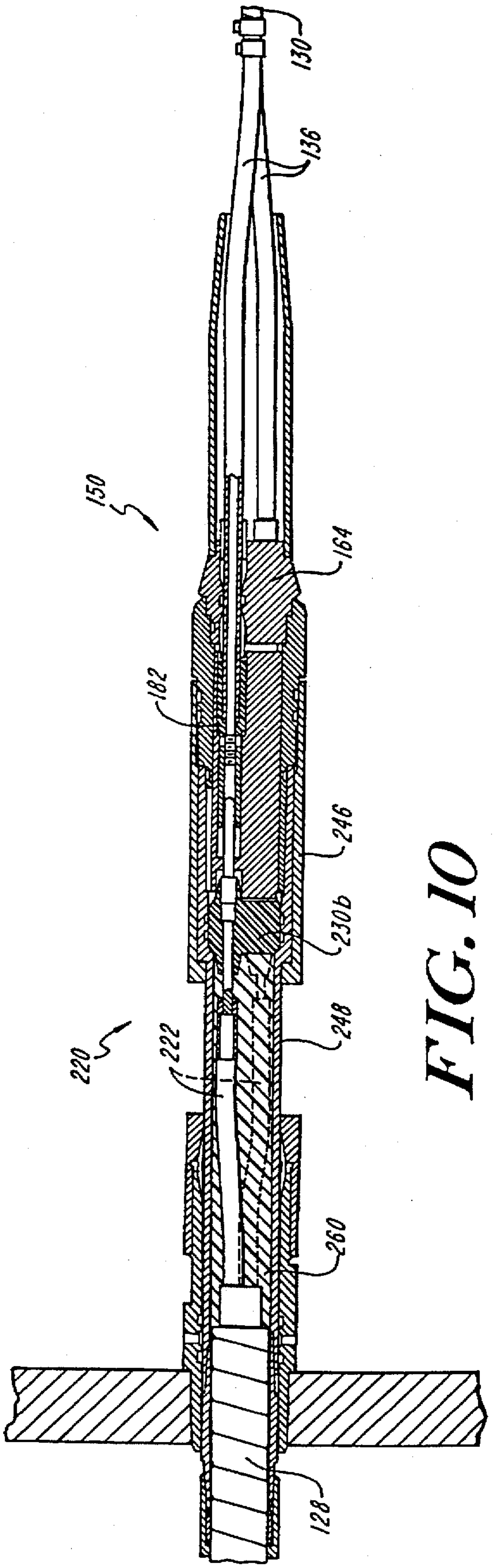
FIG. 10 is a sectional view of the cable terminations of FIGS. 4 and 7 joined together.
Figure 11:
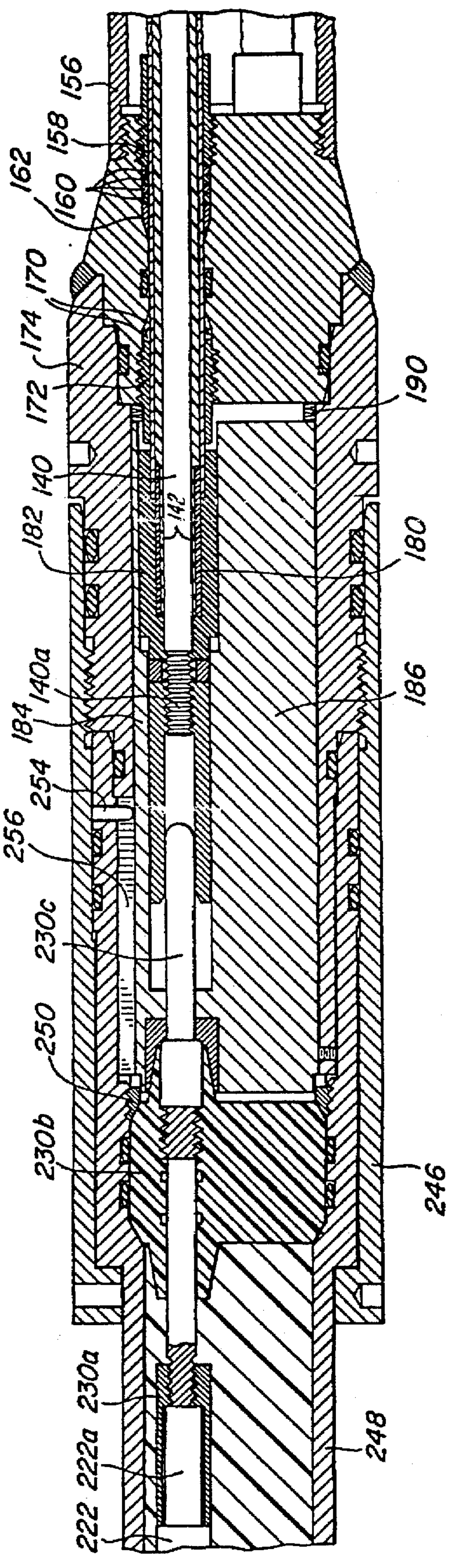
FIG. 11 is an enlarged fragmentary view of the mated termination of FIG. 10.

FIGS. 10 and 11 show the two cable terminations 150 and 220 according to the invention fully engaged and mated. The plug body 174 of the socket termination 150 telescopically fits within the coupling collar 246 of the plug termination 220. The coupling collar 246 is relatively freely rotatable to threadably engage the internal threads **246*c* therein onto the external threads on the section 174***b* of the plug body 174. This telescopic interfit, with selected rotational orientation of the two terminations as provided by an axial key 254 on the penetrator body 248 slidably engaging in an axial keyway 256 recessing the plug body 174, seats the multiple plug contacts 230*c* on the termination 220 within corresponding socket contacts 184 of the socket receptacle 150.

The two terminations 150 and 220 can be coupled together as in FIGS. 10 and 11 with a relatively large range of axial telescoping interfit, to accommodate a relatively large range of axial dimensions of the terminated cable structures being mated.

Figure 12:
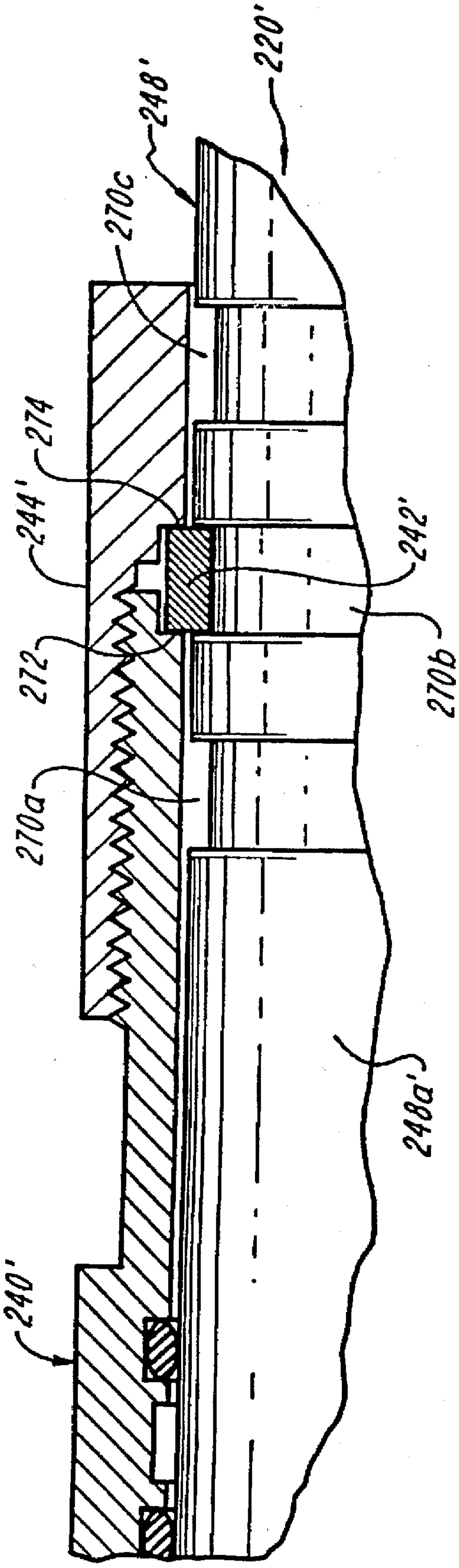
FIG. 12 is a fragmentary view of an alternative construction for the cable termination of FIG. 7.

FIG. 12 shows a plug termination 220' and an adapter 240' that have an alternative construction form the embodiment of FIGS. 6–11. One feature of the FIG. 12 embodiment is that it provides an axially adjustable yet positive axial mounting of the termination 220' with the adapter 240'. More particularly, the termination 220' is identical to the termination 220 of FIGS. 6–11, and is assembled in the same manner, except for the provision of an axial succession of circumferential grooves 270*a*, 270*b* and 270*c*, recessing the outer surface of the adjustment portion 248*a'* of the penetrator body 248'. The three illustrated grooves, which are uniformly dimensioned and uniformly axially spaced apart, have right-angle sides for seating a locking collar 242' securely against axial dislodgment. The locking collar 242' seats within any groove 270*a* or 270*b* or 270*c*, for selectively axially positioning the penetrator body 248' and thereby the entire termination 220' relative to the mounting adapter 240'. The illustrated locking collar 242' has a rectangular cross-section in a radial plane, as appears in FIG. 12.

In one illustrative practice, the penetrator body 248' has eight grooves 270, each one-sixteenth inch in radial depth and one-half inch in axial length. The grooves are axially spaced apart by one-half inch. The locking collar 242' has an axial length of one-half inch, to seat in a groove, and has a radial thickness of three-sixteenth inch.

The adapter 240' and the adapter coupling ring 244' of FIG. 12 are similar to the corresponding parts of the embodiment of FIGS. 6–11, except that each engages the locking collar 242' with a radially-extending shoulder 272 and 274, respectively, that axially abuts the collar 242'.

The mounting of the termination 220' with the adapter 240' thus proceeds by positioning the termination axially as desired relative to the adapter, and inserting the locking collar 242' in whichever groove 270*a/b/c* is located to maintain that axial position. The adapter coupling ring 244' is then threaded to the adapter 240' until the opposed shoulders 272 and 274 of the adapter and of the coupling ring, respectively, axially abut and clamp against the collar 242'.

It will thus be seen that the invention efficiently attains the objects set forth above, among those made apparent from the preceding description. Since certain changes may be made in the above constructions without departing from the scope of the invention and certain changes may be made in the steps of the methods set forth above and in the construction set forth without departing from the scope of the invention, it is intended that all matter contained in the above description or shown in the accompanying drawings be interpreted as illustrative and not in a limiting sense.

It is also to be understood that the following claims are intended to cover all genetic and specific features of the invention described herein, and all statements of the scope of the invention which as a matter of language might be said to fall therebetween.

Having described the invention, what is claimed as new and secured by Letters Patent is:

1. Apparatus for terminating an electrical cable having a cable end and having cable elements including a substantially rigid sheath element, a cable electrical conductor element disposed within the sheath element and an electrical insulation element having a known thickness within the sheath element for insulating the conductor element therefrom, said apparatus comprising A) electrically insulating retaining means for assembly with said cable elements at the cable end for blocking the extrusion of the cable insulation element from within the sheath element under a selected range of pressure and temperature conditions.

2. Apparatus according to claim 1 in which said retaining means is configured for both radial and axial abutment with said cable insulation element and includes A) sleeve means having a tubular body apertured to seat over an unsheathed length of the cable insulation element and in engagement with the cable insulation element, and B) means for securing the sleeve means in engagement with the cable insulation element.

3. Apparatus according to claim 2 in which said means for securing includes insulating cap means having a body axially apertured to seat over an exposed length of the cable conductor element and to seat over said sleeve means.

4. Apparatus according to claim 2 in which said means for securing includes insulating cap means arranged for assembly with the cable sheath element and having means for retaining said sleeve means in engagement with the cable insulation element.

5. Apparatus according to claim 1 in which said retaining means includes A) sleeve means apertured to seat telescopically within the cable sheath element over both the conductor element and at least part of the thickness of the cable insulation element, and B) means for securing said sleeve means in engagement with the cable insulation element.

6. Apparatus according to claim 1 in which said retaining means includes A) sleeve means configured to seat over an exposed unsheathed length of at least part of the thickness of the cable insulation element and to telescopically interfit within the cable sheath element over at least part of the thickness of the cable insulation element, and B) means for securing said sleeve means to at least one of said cable elements.

7. Apparatus according to claim 1 in which said retaining means is configured for both radial and axial abutment with one or more cable elements and includes A) cap means having a hollow portion apertured at a first end to seat over an unsheathed length of the cable insulation element in engagement with the cable insulation element, and B) a securing assembly for securing the cap means in engagement with the cable insulation element.

8. Apparatus according to claim 7 in which the cap means is configured to seat over an exposed unsheathed length of at least a part of the thickness of the cable insulation element and to telescopically interfit within the cable sheath element.

9. Apparatus according to claim 7 in which the hollow portion of the cap means extends from the first end to a second end axially distal to the first end, wherein the second end is apertured to enable an unsheathed and uninsulated portion of the electrical conductor element to pass through.

10. Apparatus according to claim 9 further comprising an electrical contact means adapted for electrical engagement with the unsheathed and uninsulated portion of the electrical conductor element passed through the second end of the cap means, wherein the electrical contact means is arranged for removable and replaceable telescopic engagement with a mating electrical contact.

11. Apparatus according to claim 7 in which the securing assembly includes

A) a rigid body having an axial through passage adapted to pass there through the cable end, and B) a support structure adapted for seating within the axial through passage and including means for supportingly coupling the cable end through the axial through passage and means for maintaining a fluid sealing engagement between the rigid sheath element and the support structure, the cap means and the support structure, and the rigid body and the support structure.

12. Apparatus according to claim 11 in which the support structure comprises

A) a first support member being substantially rigid and adapted for seating within the axial through passage and having an axially aligned through aperture adapted to pass there through a sheathed portion of the cable end, B) a sealing member being compressively deformable and adapted for seating axially adjacent to and in contact with the first support member and having a through aperture axially aligned with the through aperture of the first support member and adapted to pass there through the sheathed portion of the cable end, and C) a second support member being substantially rigid and adapted for positioning axially adjacent to and in contact with the sealing member and having a through aperture axially aligned with the through aperture of the sealing member and adapted to pass there through the cap means, the position of the second support member being axially adjustable within the through passage to exert a selectable axially compressive force on the sealing member.

13. Apparatus according to claim 12 in which in response to the axial force exerted by the second support member the sealing member deforms radially to achieve the fluid sealing engagement between the rigid sheath element and the support structure, the cap means and the support structure, and the rigid body and the support structure.

14. Apparatus according to claim 12 in which the axial through passage of the through body is characterized by a substantially cylindrical internal wall and includes a shoulder extending radially inward from the internal wall for seating the first support member, and in which the apparatus further comprises compression means for exerting an axial force on the second support member to cause the sealing member to be axially compressed between the first support member and the second support member.

15. Apparatus according to claim 14 wherein the second support member has first and second distal ends, the first end being axially adjacent to the sealing member, wherein a first segment of the second support member extending axially from the first end part way to the second end has an outer diameter substantially equal to an inner diameter of the axial through passage, and a second segment of the second support member extending axially from the second end part way to the first end has an outer diameter smaller than the inner diameter of the axial through passage thereby forming a shoulder at a junction of the first segment and the second segment, and wherein a portion of the axial through passage proximate to the second segment of the second support member is threaded, and the compression means comprises a nut being apertured to pass around the second end of the second support member and having threads on an outer surface for engaging the threaded portion of the axial through passage to enable the nut to thread over the first segment to exert an axial force on the shoulder formed at the junction of the first segment and the second segment.

16. Apparatus according to claim 12 in which the aperture of the second support means is threaded and in which an outer surface of the cap means is threaded for engagement therewith to secure the cap means in engagement with the cable insulation element.

17. Apparatus for terminating a multiple conductor electrical cable having a cable end and having multiple cable elements each including a substantially rigid sheath element and a cable electrical conductor element disposed within the sheath element and an electrical insulation element within the sheath element and insulating the conductor element therefrom, said apparatus comprising A) insulation retaining means for assembly with each of a plural cable elements at the cable end for blocking the extruding of the cable insulation element from within the sheath element under a selected range of pressure and temperature conditions.

18. Apparatus according to claim 17 in which said retaining means is configured for both radial and axial abutment with the cable insulation element and includes A) a cap means for each of the plural cable elements and having a hollow portion apertured at a first end to seat over an unsheathed length of the cable insulation element in engagement with the cable insulation element, and B) a securing assembly having multiple substantially parallel axial through apertures, each adapted for securing the cap means in engagement with the cable insulation element.

19. Apparatus according to claim 18 in which the securing assembly includes

A) a hollow rigid body having an axial through passage adapted to pass there through the cable end.

B) a support structure having multiple substantially parallel axial through apertures, adapted for seating within the axial through passage of the hollow rigid body and including means for supporting the cable end through the axial through passage and mean for maintaining a fluid sealing engagement between the rigid sheath element of each cable element and the support structure, each cap means and the support structure, and the hollow rigid body and the support structure.

20. Apparatus according to claim 19 in which the support structure comprises

A) a first support member being substantially rigid and adapted for seating within the axial through passage and having a plurality of substantially parallel axially aligned through apertures each adapted to pass there through a sheathed portion of one of the cable elements, B) a sealing member being compressively deformable and adapted for seating axially adjacent to and in contact with the first support member and having a plurality of substantially parallel through apertures axially aligned with the through apertures of the first support member and each adapted to pass there through the sheathed portion of one of the cable elements, and C) a second support member being substantially rigid and adapted for positioning axially adjacent to and in contact with the sealing member and having a plurality of substantially parallel through apertures axially aligned with the through apertures of the sealing member and each adapted to pass there through the cap means of one of the cable elements, the position of the second support means being axially adjustable within the through passage to exert an axially compressive force on the sealing member.

21. Apparatus according to claim 20 in which in response to the axial force exerted by the second support member the sealing member deforms radially to achieve the fluid sealing engagement between the rigid sheath elements and the support structure, the cap means and the support structure, and the rigid body and the support structure.

22. Apparatus according to claim 20 in which the axial through passage is characterized by a substantially cylindrical internal wall and includes a shoulder extending radially inward from the internal wall for seating the first support member, and in which the apparatus further comprises compression means for exerting an axial force on the second support member to cause the sealing member to be compressed between the first support member and the second support member.

23. Apparatus according to claim 22 wherein the second support member has first and second distal ends, the first end being axially adjacent to the sealing member, wherein a first segment of the second support member extending axially from the first end part way to the second end has an outer diameter substantially equal to an inner diameter of the axial through passage, a second segment of the second support member extending axially from the second end part way to the first end has an outer diameter smaller than the inner diameter of the axial through passage thereby forming a shoulder at a junction of the first segment and the second segment, and wherein a portion of the axial through passage proximate to the second segment of the second support member is threaded, and the apparatus comprises a nut being apertured to pass around the second end of the second support member and having threads on an outer surface for engaging the threaded portion of the axial through passage to enable the nut to thread over the first segment of the second support member to exert a selectable axial force on the shoulder at the junction of the first segment and the second segment.

24. Apparatus for terminating an electrical cable having a cable end and having cable elements including a substantially rigid sheath element, a cable electrical conductor element disposed within the sheath element and an electrical insulation element within the sheath element for insulating the conductor element therefrom, said apparatus comprising A) electrical insulating retaining means for assembly with the cable elements at the cable end for blocking the extrusion of the cable insulation element from within the sheath element under a selected range of pressure and temperature conditions, B) securing means having a securing body axially apertured to receive therein the cable sheath element and having clamp means engageable with the cable sheath element in sealing engagement between said securing body and the cable sheath element, and C) means including termination shell means for supportingly housing said retaining means and for mounting with said securing means and having an opening for receiving a removable and replaceable electrical contact element for removable and replaceable electrical contact with a cable conductor element disposed therein.

25. Apparatus according to claim 24 in which

A) said securing body has first and second axially spaced ends and is apertured therebetween and B) said clamp means includes first and second compression clamp means removably and replaceably engageable with said securing body at said first and second ends thereof, respectively, for engagement with the cable sheath element at two axially spaced locations therealong.

26. Apparatus according to claim 25 in which at least one said compression clamp means includes A) threaded nut means threadably engageable with said securing body at one said axial end of the aperture therethrough, and B) selectively deformable ferrule means for encircling the cable sheath element and disposed in compressive abutment in the aperture of said securing body between said securing body and said nut means.

27. Apparatus according to claim 24 further comprising

A) electrical contact means for removably and replaceably telescopically engaging a mating electrical contact, said electrical contact means having a base adapted for electrical engagement with the cable conductor element, and B) insulator means for supportingly mounting said contact means inside of said termination shell means.

28. Apparatus according to claim 27 in which the base of said electrical contact means is apertured for telescopically receiving the cable conductor element and further having means for compressively clamping said contact means onto the cable conductor element received therein.

29. Apparatus according to claim 24 in which said securing means includes first clamp means for fluid sealing engagement between said securing body and the cable sheath element and includes second clamp means for mechanical attaching engagement between said securing body and the cable sheath element.

30. Apparatus for terminating a multiple conductor electrical cable having a cable end and having multiple cable elements each including a substantially rigid sheath element and a cable electrical conductor element disposed within the sheath element and an electrical insulation element within the sheath element for insulating the conductor element therefrom, said apparatus comprising A) insulation retaining means for assembly with each of plural cable elements at the cable end for blocking the extrusion of the cable insulation element from within the sheath element under a selected range of pressure and temperature conditions, B) securing means having a securing body having multiple substantially parallel axial through apertures, each adapted to receive therein the cable sheath element of one conductor element and having clamp means engageable with the cable sheath element in fluid sealing engagement and in mechanical axial load bearing engagement between said securing body and the cable sheath element for terminating with such sealing and mechanical engagements each of plural cable elements in a separate axial aperture, and C) termination shell means for supportingly housing said retaining means and for attachment with said securing body and having an opening for receiving multiple removable and replaceable electrical contact elements for removable and replaceable electrical connection with a corresponding plurality of cable conductor elements disposed therein.

31. Apparatus according to claim 30 further comprising seal means forming a fluid sealing engagement between said securing body and said termination shell means, whereby said securing means is arranged by way of said clamp means for fluid sealing engagement with the sheath element of each cable element and is further arranged by way of said seal means for fluid sealing engagement with said termination shell means, and is arranged for load bearing mechanical engagement with the rigid sheath element of each of plural cable elements and further with said termination shell means.

32. Apparatus according to claim 30 further comprising

A) plural electrical contact means each arranged for removable and replaceable telescopic engagement with a mating electrical contact and each adapted for electrical engagement with the cable conductor element of one cable element, and B) insulator means for supportingly mounting said multiple contact means within said termination shell means.

33. Apparatus according to claim 32 in which at least one of said electrical contact means and said insulator means is arranged for forming an axial space for accommodating differential axial deformation of each of plural cable elements disposed in an aperture of said securing body.

34. Apparatus according to claim 30 in which said insulation retaining means includes electrically insulating sleeve means apertured for telescopically seating at least partially within the cable sheath element over both the conductor element and at least part of the thickness of the cable insulation element and includes means for securing said sleeve means in both radial and axial engagement with the cable insulation element.

35. Apparatus according to claim 30 in which

A) said securing body includes a header element and in which said clamp means includes first and second compression clamp means removably and replaceably engageable with one aperture of said header element for engagement with the cable sheath element disposed therein at two axially spaced locations therealong, and B) in which said termination shell means and said header element include means for removable and replaceable axially telescopic attachment therebetween.

36. Apparatus according to claim 30 in which at least one of said insulation retaining means and said securing means is arranged for forming an axial clearance space for each of said plural cable elements disposed in an aperture of said securing body for accommodating differential axial deformation.

37. Apparatus for terminating an electrical cable having a cable end and having cable elements including a sheath element, a cable electrical conductor element disposed within the sheath element and an electrical insulation element within the sheath element for insulating the conductor element therefrom, said apparatus comprising A) body means having a tubular outer surface extending along an axis and configured for axially adjustable mounting attachment thereto and having an axial through passage therein, B) contact means removably and replaceably seated in said passage of said body means with a fluid seal therewith for sealing said through passage at one axial location, and having at least one electrical contact means disposed within said passage for connection to a cable conductor element and for removable and replaceable connection with a mating connection member, C) attachment means removably and replaceably attached to said body means and for selective mechanical mounting engagement with the cable sheath element, and D) first sealing means for sealing a cable conductor element disposed within said passage of said body means from exposure to environmental fluid from other than at said one axial location.

38. Apparatus according to claim 37 further comprising second sealing means resiliently engaged between said contact means and said passage of said body means for forming said fluid seal at said one axial location.

39. Apparatus according to claim 37 in which said first sealing means includes an insulating body disposed within said passage of said body means for embedding an unsheathed length of a cable electrical conductor element.

40. Apparatus according to claim 37 in which said first sealing means includes resiliently flexible insulating means disposed within said passage of said body means for embedding therein a cable electrical conductor element, said sealing means being adapted for fluid sealing engagement with said body means for sealing said passage at least at a second location axially spaced from said one axial location.

41. Apparatus according to claim 37 in which said attachment means includes tubular clamp means in threaded engagement with said body means.

42. Apparatus according to claim 37 in which said tubular outer surface of said body means includes a substantially cylindrical outer surface section for substantially continuous selective axial adjustable mounting of said body means.

43. Apparatus according to claim 37 in which said tubular outer surface of said body means includes a succession of axially spaced circumferential grooves radially recessing said outer surface for incrementally adjustable axial mounting of said body means.

44. Apparatus according to claim 37 in which said contact means includes an electrically insulating header means seated within the passage of said body means with said fluid seal therewith and mounting at least one electrical contact means for connection to the conductor element of the cable and for connection with a mating connection member.

45. Apparatus for terminating an electrical cable having a cable end and having cable elements including a sheath element, a cable electrical conductor element disposed within the sheath element and an electrical insulation element within the sheath element and insulating the conductor element therefrom, said apparatus comprising A) body means having a tubular outer surface extending along an axis and configured for axially adjustable mounting attachment thereto and having an axial through passage therein, B) contact means removably and replaceably seated in said passage of said body means with a fluid seal therewith for sealing said through passage at one axial location, and having at least one electrical contact means disposed within said passage for connection to a cable conductor element and for removable and replaceable connection with a mating connection member, C) attachment means removably and replaceably attached to said body means and for selective mechanical clamping engagement with the cable sheath element, and D) mounting adapter means having an axially extending mounting passage therethrough for removably and replaceably telescopically receiving therein said body means with said tubular outer surface thereof adjustably axially located relative to said mounting adapter means.

46. Apparatus according to claim 45 further comprising mounting sealing means sealingly engaged within said mounting passage between said tubular outer surface of said body means and said mounting adapter means and forming a fluid seal therebetween.

47. Apparatus according to claim 45 in which said mounting adapter means includes locking collar means and mounting coupling means for selectively compressively clamping said locking collar means onto said tubular outer surface of said body means.

48. Apparatus according to claim 45

A) in which said tubular outer surface of said body means includes plural axially spaced circumferential grooves radially recessing said tubular outer surface, and B) said mounting adapter means includes an adapter body and locking collar means removably and replaceably seated in one said groove and means for removably and replaceably securing said locking collar means to said adapter body.

49. Apparatus according to claim 45 further comprising

A) radially engageable means disposed at selected axial spacings along said tubular outer surface of said body means, and B) locking means for engagement with said radially engageable means at a selected axial location along said tubular outer surface and removably and replaceably engageable with said mounting adapter means.

50. A method for terminating an electrical cable having a cable end and having cable elements including a sheath element, plural cable electrical conductor elements disposed within the sheath element and an electrical insulation element within the sheath element and insulating each conductor element therefrom, said method comprising the steps of A) electrically connecting each cable electrical conductor element at the cable end with an electrical contact member, B) forming a flexible and electrically insulating sealing body over the connection of each cable electrical conductor element with an electrical contact, C) disposing the assemblage of the sealing body and each electrical conductor element and electrical contact member connected thereto within an axial passage of a termination body for sealing each cable conductor element at the cable end from exposure to fluid external to said termination body, and D) mechanically seeming the cable sheath element to said termination body.

51. A method according to claim 50 comprising the further step of adhering said sealing body to said passage of said termination body.

52. A method according to claim 50 in which said step of forming said sealing body includes molding an insulating material onto the interconnected cable conductor elements and contact means.

53. A method according to claim 50 including the further step of forming said sealing body with a substantially tubular axially extending outer surface having sealing means thereon for sealing engagement with said passage of said termination body upon assembly therewith.

* * * * *